US007237001B2

(12) United States Patent
Yokono et al.

(10) Patent No.: US 7,237,001 B2
(45) Date of Patent: Jun. 26, 2007

(54) DOWNLOADING SYSTEM

(75) Inventors: Shigeru Yokono, Kanagawa (JP);
Seiichi Misawa, Kanagawa (JP);
Satoshi Otsuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 982 days.

(21) Appl. No.: 10/016,242

(22) Filed: Oct. 30, 2001

(65) Prior Publication Data
US 2002/0049830 A1    Apr. 25, 2002

(51) Int. Cl.
*G06F 15/16* (2006.01)
(52) U.S. Cl. .................. 709/200; 709/213; 709/203; 709/217; 360/55; 360/59; 360/60
(58) Field of Classification Search ........ 709/213–215, 709/217–219, 203; 360/55, 59–60
See application file for complete search history.

(56) References Cited

U.S. PATENT DOCUMENTS

| | | | | |
|---|---|---|---|---|
| 5,592,511 A | * | 1/1997 | Schoen et al. | 375/220 |
| 5,617,263 A | * | 4/1997 | Mizushima et al. | 360/48 |
| 5,636,277 A | * | 6/1997 | Nagahama | 705/59 |
| 5,687,397 A | * | 11/1997 | Ohmori | 710/73 |
| 5,715,105 A | * | 2/1998 | Katayama et al. | 360/48 |
| 5,731,923 A | * | 3/1998 | Sakuma | 360/69 |
| 5,740,435 A | * | 4/1998 | Yamamoto et al. | 707/100 |
| 5,784,609 A | * | 7/1998 | Kurihara | 707/9 |
| 5,805,551 A | * | 9/1998 | Oshima et al. | 360/48 |
| 5,930,825 A | * | 7/1999 | Nakashima et al. | 711/163 |
| 5,949,953 A | * | 9/1999 | Shirakawa et al. | 386/70 |
| 6,192,188 B1 | * | 2/2001 | Dierke | 386/95 |
| 6,195,432 B1 | * | 2/2001 | Takahashi et al. | 380/277 |
| 6,215,745 B1 | * | 4/2001 | Sako et al. | 369/47.12 |
| 6,229,882 B1 | * | 5/2001 | Nunokawa et al. | 379/88.22 |
| 6,249,771 B1 | * | 6/2001 | Kurihara | 705/26 |

* cited by examiner

*Primary Examiner*—Philip B. Tran
(74) *Attorney, Agent, or Firm*—Bell, Boyd & Lloyd LLP

(57) ABSTRACT

A downloading system which can be used freely by many and unspecified persons. A recording medium is loaded in a public downloading apparatus, and use condition confirmation processing is performed by using information recorded on the medium. Processing for downloading various sorts of information using the public downloading apparatus is allowed to be started according to a result of the use condition confirmation processing. Communication of information necessary for use condition confirmation processing with respect to use of the public downloading apparatus or for downloading processing can be performed between the public downloading apparatus and a server system.

2 Claims, 25 Drawing Sheets

FIG. 2

| SYSTEM CONNECTION FORM | | FUNCTION | | | FEE PAYMENT MODE | | | |
|---|---|---|---|---|---|---|---|---|
| TYPE A | NETWORK CONNECTION | CAPABLE OF SATELLITE COMMUNICATION | CAPABLE OF DOWNLOADING FROM MEDIUM IN DOWNLOADING APPARATUS | CAPABLE OF DOWNLOADING FROM NETWORK | CAPABLE OF UPDATING BY SATELLITE COMMUNICATION | INCAPABLE | CAPABLE OF CREDIT CARD PAYMENT BASED ON PAYMENT REGISTRATION | HAVING FEE COLLECTION FUNCTION AND CAPABLE OF CURRENCY /PREPAID CARD PAYMENT | CAPABLE OR INCAPABLE |
| | WITHOUT SATELLITE COMMUNICATION | | | INCAPABLE | | | | |
| TYPE B | NETWORK AND TELEPHONE LINE CONNECTION | CAPABLE OF SATELLITE COMMUNICATION | | | CAPABLE OF UPDATING BY SATELLITE COMMUNICATION | HAVING TELEPHONE FUNCTION AND CAPABLE OF BEING USED AS PUBLIC TELEPHONE | USABLE WITHOUT CHARGE | | HAVING CARD ADAPTIVE FUNCTION AND CAPABLE OF CREDIT CARD PAYMENT |
| | WITHOUT SATELLITE COMMUNICATION | | | INCAPABLE | | | | |
| TYPE C | NON-NETWORK CONNECTION | | INCAPABLE | INCAPABLE | | INCAPABLE | INCAPABLE | | INCAPABLE |

FIG. 9

| DOWNLOADING APPARATUS USE START TIME |
|---|
| PUBLIC DOWNLOADING APPARATUS NUMBER |
| ○  NAME OF DOWNLOADED APPLICATION PROGRAM |
| ○  NAME OF DOWNLOADED DATA |
| ○  NAME OF DOWNLOADED CONTENT |
| ⋮ |
| DOWNLOADING APPARATUS USE FINISH TIME |

FIG. 10

| | |
|---|---|
| | PUBLIC DOWNLOADING APPARATUS NUMBER |
| | PUBLIC DOWNLOADING APPARATUS USE FEE, TIME |
| O | DOWNLOADED APPLICATION PROGRAM FEE |
| O | DOWNLOADED DATA FEE |
| O | DOWNLOADED CONTENT FEE |
| | ⋮ |
| | METHOD OF PAYMENT |

FIG. 13

| | MEDIUM ID | USER ID | PASSWORD | CREDIT CARD NUMBER |
|---|---|---|---|---|
| #1 | 00824195-6301 | AB6151 | 1234 | 1234-5678-9012-3456 |
| #2 | 00005531-9910 | ZZZAQC | 5555 | 3296-1111-2222-3456 |
| #3 | 10101234-5678 | 346218 | 6239 | 0000-0101-3334-1121 |
| ------- | ------- | ------- | ------- | ------- |

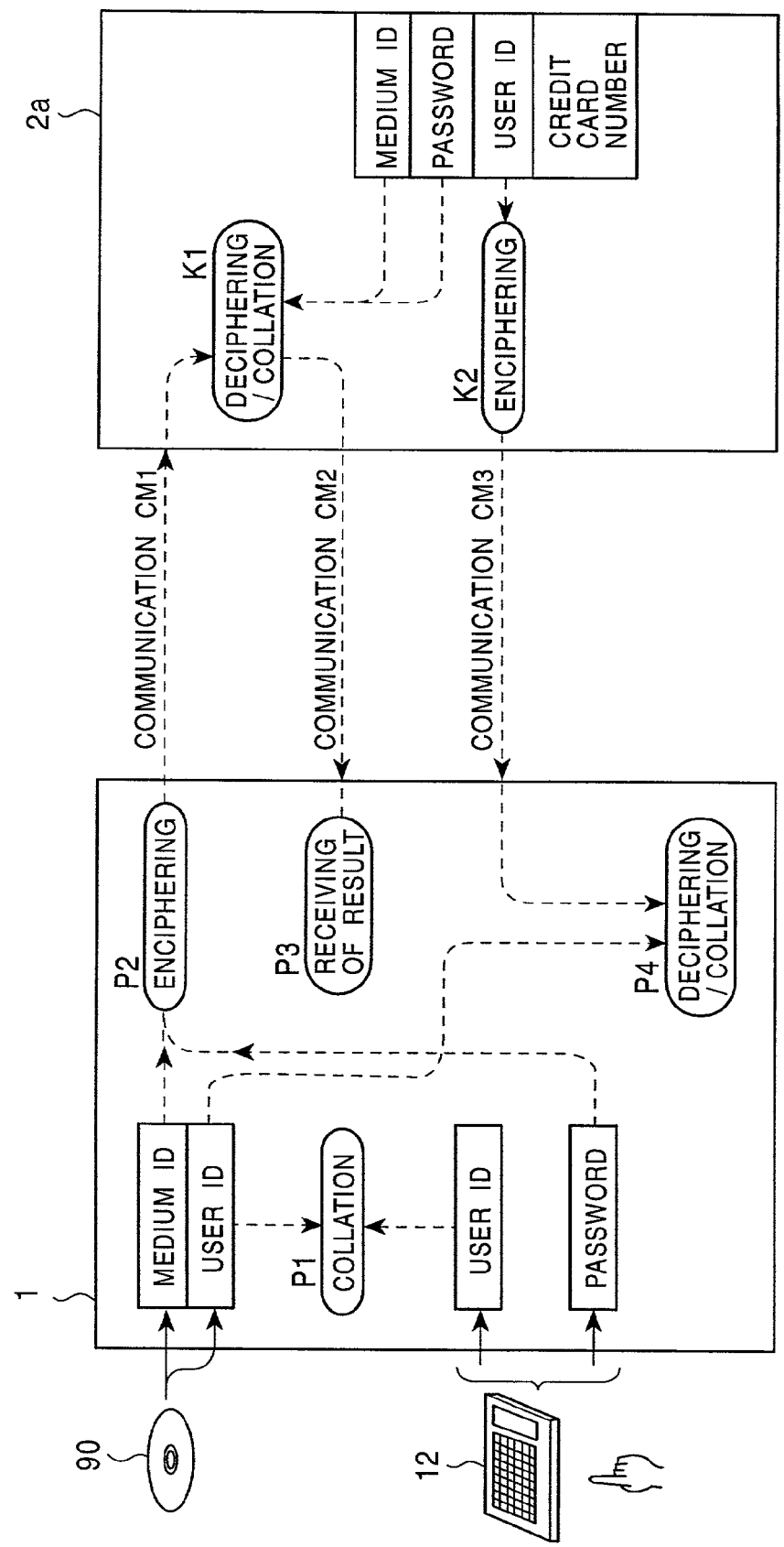

FIG. 20

(a)
```
DOWNLOAD MENU

SELECT ONE OF THE FOLLOWING
YOU WISH TO DOWNLOAD

1  NEWSPAPER
2  MAGAZINE
3  VIDEO SOFTWARE          [CANCEL]
4  MUSIC SOFTWARE
5  APPLICATION SOFTWARE    [NEXT PAGE]
```

↓ FIRST ONE SELECTED (b)
```
DOWNLOAD MENU

SELECT NEWSPAPER YOU WISH
TO DOWNLOAD

1  DAILY MAIASA
2  DAILY YOMIKAI
3  DAILY THONAN
4  SPORTS KANTO           [CANCEL]
5  NITCHU SPORTS          [NEXT PAGE]
```

↓ THIRD ONE SELECTED

DAILY THONAN DOWNLOADED

DOWNLOADING SYSTEM

BACKGROUND OF THE INVENTION

1. Field of the Invention

The present invention relates to downloading system and, more particularly, to a downloading system which can be used by, for example, many and unspecified users to download various sorts of information according to their needs.

2. Description of the Related Art

Various sorts of software suitable for use in information apparatuses, e.g., application software for use in personal computers and contents of media (magazines, newspapers, music software, video software, game software, etc.) reproducible and/or editable by a personal computer, an audio and visual apparatus or the like, are now being provided for pay or free.

However, a user cannot obtain one of such various sorts of software except by purchasing it in a software package in the form of a CR-ROM or the like or by connecting his or her personal computer to a network such as the Internet and downloading it.

Therefore, there is a demand for a software acquisition system which can be easily used by a number of persons to obtain information according to their needs.

SUMMARY OF THE INVENTION

In view of the above-described circumstances, an object of the present invention is to provide a downloading system which can be used by, for example, many and unspecified users to download information according to their needs.

To achieve this object, according to the present invention, a downloading system is formed which includes a downloading terminal, a server system communicably connected to the downloading apparatus, and a recording medium with which recording and reproducing operations can be performed on the downloading terminal side.

On the recording medium, download identification (ID) information which designates information which is to be downloaded is recorded.

The downloading system is arranged in such a manner that, after the recording medium has been loaded in the downloading terminal, processing for downloading to the recording medium with the downloading terminal is allowed to be started according to a result of use condition confirmation processing using information recorded on the recording medium, and that processing for downloading certain information to the recording medium can be executed based on download ID information recorded on the recording medium loaded in the downloading terminal.

Further, the arrangement may be such that communication of information necessary for use condition confirmation processing with respect to use of the downloading terminal or for downloading processing can be executed between the downloading terminal and the server system.

Under other circumstances, a downloading system may be constituted of a downloading terminal and a recording medium with which recording and reproducing operations can be performed on the downloading terminal side. Also, download ID information which designates information which is to be downloaded is recorded on the recording medium.

This downloading system is also arranged so that, after the recording medium has been loaded in the downloading terminal, processing for downloading to the recording medium with the downloading terminal is allowed to be started according to a result of use condition confirmation processing using information recorded on the recording medium, and so that processing for downloading certain information to the recording medium can be executed based on download ID information recorded on the recording medium loaded in the downloading terminal.

In each of these downloading systems, a user pocesses his or her own recording medium corresponding to the above-described recording medium. The downloading terminal is installed, for example, on a ground of a railroad station ar at a store front to enable many and unspecified persons to use the terminal at will.

On the recording medium can be recorded discrimination code information for enabling the medium to be recognized as one adapted to the downloading system, serial number information, user ID information freely set by a user, and other information as well as the above-mentioned download ID. A user loads his or her own recording medium in one downloading terminal provided for public use. The user is allowed to use the downloading terminal according to a result of collation between information input by the user and the information on the recording medium performed as the above-mentioned use condition confirmation processing, and other collation results.

If payment of a certain charge or use is required for downloading (if, for example, fee collection based on drawing out a charged amount from a credit card account is performed), collation of a higher degree using password information is also performed as use condition confirmation processing.

If the user is allowed to use the downloading terminal after the above-described use condition confirmation processing, the user downloads information to the recording medium according to his or her need.

Specifically, the arrangement may be such that the downloading terminal automatically downloads predetermined information according to the download ID recorded on the recording medium. If downloading is performed in this manner, a user may only loads his or her recording medium in the downloading terminal to execute downloading, except for the operation for the above-described use condition confirmation processing. Needless to say, a user can select information as a downloading object without requiring such automatic downloading.

That is, if a user possesses his or her own recording medium, the of obtaining information by using the public downloading terminal is easy for the user to perform.

Use record information and fee record information with respect to payment according to use may also be recorded on the recording medium.

A plurality of downloading terminals corresponding to the above-described downloading terminal may have wireless communication means used to load the terminals with downloadable information from the server system. In such a case, data in the downloading terminals in different places can be updated promptly and easily.

BRIEF DESCRIPTION OF THE DRAWINGS

FIG. 2 is a diagram for explaining different types of public downloading apparatus in the downloading system of the embodiment of the invention;

FIG. 9 is a diagram showing use record information recorded on the disk in the embodiment of the invention;

FIG. 10 is a diagram showing fee record information recorded on the disk in the embodiment of the invention;

FIG. 13 is a diagram showing registration information on the charging server side in the embodiment of the invention;

FIG. 19 is a diagram for explaining use condition confirmation processing in the case of registration payment for use of the public downloading apparatus connected to the network in the embodiment of the invention;

FIG. 20 is a diagram showing windows for selecting information to be downloaded in the public downloading apparatus in the embodiment of the invention;

DESCRIPTION OF THE PREFERRED EMBODIMENT

A downloading system which represents an embodiment of the present invention will be described in the order shown below.

A downloading terminal in this embodiment will be referred to as "public downloading apparatus", and an example of a recording medium referred to below is a disk-like medium.

[I] System Configuration
[II] Network Downloading System
   II-1. Construction of Public Downloading Apparatus
   II-2. Disk
   II-3. Use Procedure
   II-4. Processing in Public Downloading Apparatus
[III] Non-network Downloading System
   III-1. Construction of Public Downloading Apparatus
   III-2. Processing in Public Downloading Apparatus

[I] System Configuration

The configuration of a downloading system which represents an embodiment of the present invention will be described below with reference to FIGS. 1 and 2.

Figure 1:
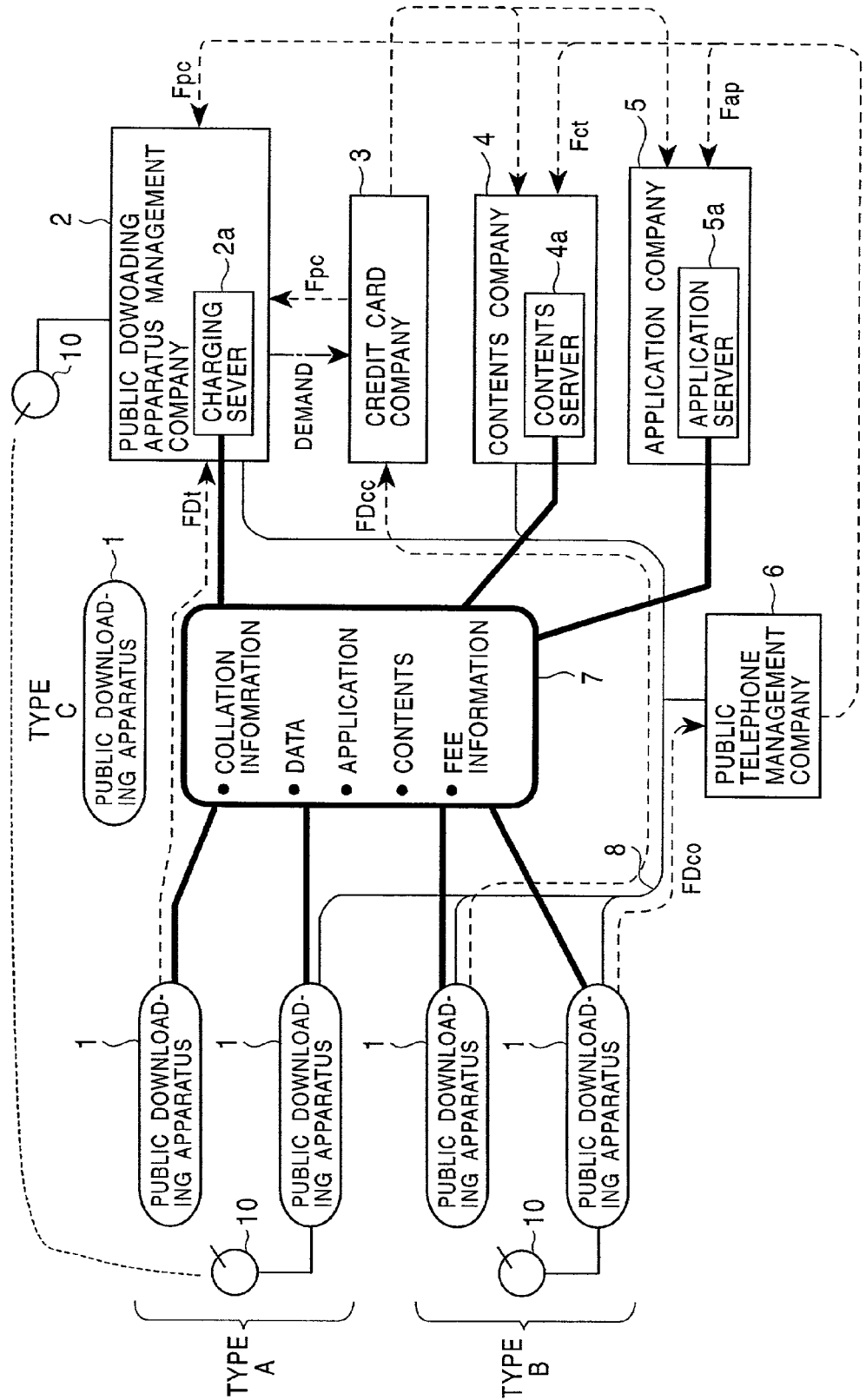
FIG. 1 is a diagram showing the network configuration of a downloading system which represents an embodiment of the present invention.

FIG. 1 shows constituents of the system and an example of a fee collection method for a fee-charging system. FIG. 2 shows functions and fee payment methods with respect to types of public downloading apparatus.

As shown in FIG. 1, the downloading system of this embodiment is formed between public downloading apparatuses 1, a public downloading apparatus management company 2, a credit card company 3, a contents company 4, an application company 5, a public telephone management company 6, a network 7, telephone lines 8, and satellite communication units 10.

That is, a plurality of public downloading apparatuses 1 provided as downloading terminals are connected by network 7 between a plurality of servers (charging server 2a in public downloading apparatus management company 2, contents server 4a in contents company 4, and application server 5a in application company 5). Some of the public downloading apparatuses 1 are also connected by telephone lines 8 or by wireless communication using satellite communication units 10 as well as by network 7. There are other public downloading apparatuses 1 not connected to the network.

Types A, B, and C of public downloading apparatuses 1 will be described with respect to their different connected forms.

Type-A public downloading apparatus 1 is a public downloading apparatus connected to network 7. The network 7 is a communication network formed as, for example, a local area network (LAN) for this downloading system. The network 7 is controlled by the public downloading apparatus management company 2, for example.

If the public downloading apparatus management company 2 has satellite communication unit 10 as illustrated, type A public downloading apparatus 1 may have satellite communication unit 10.

Type-B public downloading apparatus 1 is a public downloading apparatus connected to network 7 and to telephone line 8. Telephone line 8 is, for example, a line in an ordinary public telephone network controlled by public telephone management company 6.

This type-B public downloading apparatus 1 may also has satellite communication unit 10.

Type-C public downloading apparatus 1 is a public downloading apparatus which is not connected to the network 7, nor to telephone line 8, which is not provided with satellite communication unit 10, and which functions in a single state.

The construction and the operation of type-A and type-B public downloading apparatuses 1 constituting a network downloading system will be described in detail in the next section. The construction and operation of Type-C public downloading apparatus 1 constituting a non-network downloading system will be described in detail subsequently.

Each type of public downloading apparatus 1 is set in a place such as to be usable by a certain number of unspecified persons, e.g., a store front or a building or ground of a railroad station, a school or a company.

A user can use public downloading apparatus 1 by loading his or her disk in the apparatus 1 with a fee charged for use or free of charge.

Thus, this system enables a user to download a desired one of various sorts of data to a disk by using public downloading apparatus 1.

The public downloading apparatus management company 2 controls the public downloading apparatus 1 installed in each place, registers users, and performs collation processing for preventing unauthorized use with respect to registered users, fee collection management with respect to use by registered users, and so on. The charging server 2a is a section for performing these processings.

Between the public downloading apparatus management company 2 and each public downloading apparatus 1, uploading or downloading of various sorts of data, application software, contents of media (files or the like each corresponding to one information unit), etc. can be performed via the network 7 or satellite communication units 10 in the case of need.

If information downloaded by a user using public downloading apparatus 1 needs updating, the public downloading apparatus management company 2 periodically or non-periodically supplies updating data via the network 7 or satellite communication units 10 to execute updating on the public downloading apparatus 1 side.

For example, if a user is allowed to have a daily electronic newspaper or the like downloaded to his or her desk every day (or at desired times), the public downloading apparatus management company 2 transmits electronic news data having new contents to the corresponding public downloading apparatus 1 to update user's data each time the electronic newspaper is newly issued. If such updating is executed through the network 7 or satellite communication units 10, latest data can be instantly downloaded to a multiplicity of public downloading apparatuses 1 without requiring manual operation for each public downloading apparatus 1.

Updating in the downloading system is not limited to such updating via the network 7 or satellite communication units. For example, the contents of downloadable data may be updated in such a manner that disks or the like having updating data recorded thereon are distributed and a clerk in charge at the place where each public downloading apparatus is placed (store clerk or the like) loads the distributed disk in the public downloading apparatus 1 to update the contents of downloaded data.

The credit card company 3 is a company which performs management of credit cards generally used. When a user registered with the above-described public downloading apparatus management company pays a charge by using a credit card, the credit card company 3 does, based on a demand from the public downloading apparatus management company 2, a service of receiving the amount of money corresponding to the charge drawn out from a user's bank account and paying it to organizations which are payees of the charged amount (public downloading apparatus management company 2, contents company 4, application company 5, etc.).

The contents company 4 provides, via the network 7, each public downloading apparatus 1 with electronic information for many and unspecified persons, e.g., electronic newspapers, electronic magazines, electronic books, music information (pieces of music or the like), video information (television programs and motion pictures). Each of these sorts of information is provided as one content of a medium to be stored in the contents server 4a. Each of contents stored in the contents server 4a is transmitted to the public downloading apparatus 1 according to a request from the public downloading apparatus 1 or is periodically transmitted to the public downloading apparatus 1 to update the corresponding information in the public downloading apparatus 1.

Needless to say, the contents company 4 may have satellite communication unit 10 to provide a content of a medium to each public downloading apparatus 1 by satellite communication.

The application company 5 provides the downloading system with application software. That is, the application company 5 provides, from its application server 5 and via the network 7, each public downloading apparatus 1 with application software usable in the public downloading apparatus 1 or downloadable by using the public downloading apparatus 1. The application company 5 also provides an application program according to a request from the public downloading apparatus 1.

The application company 5 may also have satellite communication unit 10 to provide application software to each public downloading apparatus 1 by satellite communication.

The public telephone management company 6 controls the public telephone network. If each type-B public downloading apparatus 1 has a telephone function, it can be used as a public telephone. The telephone management company 6 controls each type-B public downloading apparatus 1 when the type-B apparatus is used as a public telephone.

Realizable functions and fee payment modes in the downloading system 1 thus formed will be described with reference to FIG. 2 with respect to each type of public downloading apparatus 1.

Referring to FIG. 2, each public downloading apparatus 1 has, as its main functions, a function for downloading information from a medium in the public downloading apparatus 1 to a disk in the possession of a user, a function for downloading information from a server system (contents server 4a, application server 5a or the like) to a disk in the possession of a user via the network 7, and a function for downloading information from a server system (contents server 4a, application server 5a or the like) to a disk in the possession of a user via satellite communication units 10. Each public downloading apparatus 1 may also has an auxiliary function corresponding to the function of a public telephone.

The function for downloading information from a medium in public downloading apparatus 1 to a disk in the possession of a user enables a user to download a data file, an application program, a content of an information medium or the like recorded on a recording medium (e.g., a hard disk) in public downloading apparatus 1 to his or her disk.

This function can be activated regardless of the state of connection in the network. That is, this function can be activated in each of type-A to type-C public downloading apparatuses 1.

The function for downloading information obtained via the network 7 to a disk enables a user to download to his or her disk a data file, an application program, or a content of a medium (an electronic publication, music software, video software, game software, or the like) as information provided from a terminal to which public downloading apparatus 1 is connected via the network, e.g., another public downloading apparatus 1, the public downloading apparatus management company 2, the contents company 4, or the application company 5.

Needless to say, type-A and/or type-B public downloading apparatuses 1 is arranged to use this function since connection to the network is necessary for this function.

The function for downloading information obtained by communication through satellite communication units 10 to a disk enables a user to download to his or her disk a data file, an application program, or a content of a medium (an electronic publication, music software, video software, game software, or the like) as information provided from the public downloading apparatus management company 2, which is a terminal having satellite communication unit 10 (alternatively, from any of other public downloading apparatuses 1, the contents company 4 and the application company 5 in other possible cases). Needless to say, type-A and/or type-B public downloading apparatuses 1 is arranged to use this function since satellite communication unit 10 is required for this function.

Other public downloading apparatuses 1 may also be provided which are not connected to the network 7, nor to telephone lines 8, but which have satellite communication units 10. Needless to say, this type of public downloading apparatus 1 also enables a user to download information obtained via satellite communication unit 10 to his or her disk.

Public downloading apparatus 1 can function as a public telephone if it has a public telephone function and, of course, if it is connected to the public telephone network. Therefore, only type-B public downloading apparatus 1 can have the additional public telephone function.

Fee payment modes will now be described. Each of the different types of public downloading apparatus 1 can be provided to be used without charge by the general public (or a restricted number of persons in an organization). For example, public downloading apparatuses may be provided in several places of a school and students to enable members in the stuff in the school to freely use the public downloading apparatuses 1 to execute processing based on the above-described functions.

If downloading is charged for, a user may pay for it by registering for payment with the public downloading apparatus management company 2 such that the charged amount is automatically deducted from a user's credit card account, may pay in currency or with a prepaid card, or may pay by credit card loading.

With respect to credit card payment based on payment registration, the public downloading apparatus company 2 performs necessary management.

When a user purchases a disk, he or she takes the necessary registration procedure for using public downloading apparatus 1 with the disk and paying for use with a credit card.

After the public downloading apparatus management company 2 has accepted the registration, the user can use public downloading apparatus 1 by using the disk without current money or a prepaid card.

In this-case, at the time of use of public downloading apparatus 1, the loaded disk and the user are strictly checked in each of the public downloading apparatus 1 and the charging server 2a. If the results of checking are OK, the user is allowed to use the public downloading apparatus 1.

In this checking, a disk serial number, a user identification code (ID) and a password or similar data are used. A method for this checking will be described below in detail.

When use of public downloading apparatus 1 is finished, information FDt for charging a fee is sent from the used public downloading apparatus 1 to the charging server 2a, as shown in FIG. 1, for example.

Based on management performed by the charging server 2a, the public downloading apparatus management company 2 presents the credit card company 3 with the user fees (a fee for use of the public downloading apparatus, a download fee (software purchase fee), etc.) and charges a fee Fpc for use of the public downloading apparatus. The credit card company 3 receives from a user's bank account the amount of money corresponding to the fee presented by the public downloading apparatus management company 2, and pays the fee Fpc for use of the public downloading apparatus to the public downloading apparatus management company 2.

Public downloading apparatus fee Fpc is a fee to be paid by a user according to, for example, the time period through which the user uses public downloading apparatus 1.

If a pay content provided by the contents company 4 has been purchased (downloaded) by using the public downloading apparatus, the credit card company 3 pays the corresponding content purchase fee Fct to the contents company 4.

Further, if a pay application program provided by the application company 5 has been purchased (downloaded) by using the public downloading apparatus, the credit card company 3 pays the corresponding application purchase fee Fap to the application company 5.

This method of collecting fees from users is used on condition that each user having a credit card has a payment registration with the public downloading apparatus management company 2, and that public downloading apparatuses 1 used are connected to the network 7 or have the satellite communication function. Therefore, the public downloading apparatuses used in this case are limited to the type A or B.

The above-described payment method using a credit card will hereinafter be referred to as "registration payment" for convenience' sake.

A method of payment in current money (coins or notes) or with a prepaid card will next be described. Each type of public downloading apparatus 1 may have a processing function adapted to use of coins or a prepaid card. If each type of public downloading apparatus 1 has such a function, this payment method is usable regardless of the types of public downloading apparatus.

However, only use of type-B public downloading apparatus 1 is possible in the case of using public downloading apparatus 1 as a public telephone with a processing function adapted to use of coins or a prepaid card to collect telephone charges. In such a case, when type-B public downloading apparatus 1 is used with coins or a prepaid card, it transmits information FDco for charging a fee to the public telephone management company 6 via telephone line 8, for example.

The public telephone management company 6 pays fee Fpc for use of the public downloading apparatus to the public downloading apparatus management company 2 based on the transmitted data of user fees (a fee for use of the public downloading apparatus, a content purchase fee, an application purchase fee, etc.)

If a content provided by the contents company 4 has been purchased by using the public downloading apparatus, the public telephone management company 6 pays the corresponding content purchase fee Fct to the contents company 4. If an application program provided by the application company 5 has been purchased by using the public downloading apparatus, the public telephone management company 6 pays the corresponding application purchase fee Fap to the contents company 4.

Another payment method, such as that recently introduced into the public telephone system, is possible in which, to use public downloading apparatus 1, a credit card is directly loaded in the public downloading apparatus 1. In such a case, it is necessary that the public downloading apparatus 1 has a processing function adapted to such use of a credit card.

If public downloading apparatus 1 is used with such a payment method, it transmits information FDcc for charging a fee to the credit card company 3 via telephone line 8, for example.

Based on the transmitted data on user fees (a fee for use of the public downloading apparatus, a content purchase fee, an application purchase fee, etc.), the credit card company 3 receives from a user's bank account the amount of money corresponding to the charge, pays fee Fpc for use of the public downloading apparatus to the public downloading apparatus management company 2, pays content purchase fee Fct to the contents company 4, and pays application purchase fee Fap to the application company 5.

With respect to this method, type-B public downloading apparatus is exclusively used since connection to telephone line 8 is necessary. However, if the credit card company 3 is connected to the network 7, it is also possible to use type-A public downloading apparatus 1.

The above-described payment method of directly depositing or inserting current money, a prepaid card or a credit card in public downloading apparatus 1 will hereinafter be referred to as "deposition payment" for convenience' sake.

The constituents of the downloading system, the fee payment modes, and the functions of public downloading apparatuses 1 have been described with reference to FIGS. 1 and 2. However, they are only an example of specific arrangements and operating functions of the system described below.

In particular, a wide variety of organizations constituting the downloading system is conceivable (with respect to the number and the type of server systems) and, correspondingly, various network connections and fee collection systems may be formed.

[II] Network Downloading System

II-1. Construction of Public Downloading Apparatus

A downloading system connected in a network will now be described. In this downloading system, public downloading apparatuses 1 used are of the above-described type A or B.

The following description is made chiefly of type-B public downloading apparatus 1. The type A is basically the same as the type B with respect to the construction and operation of public downloading apparatus 1 while it has no function corresponding to the public telephone function of the type B. Therefore, only differences of the type A from the type B will be described last as details of the type A.

Figure 3:
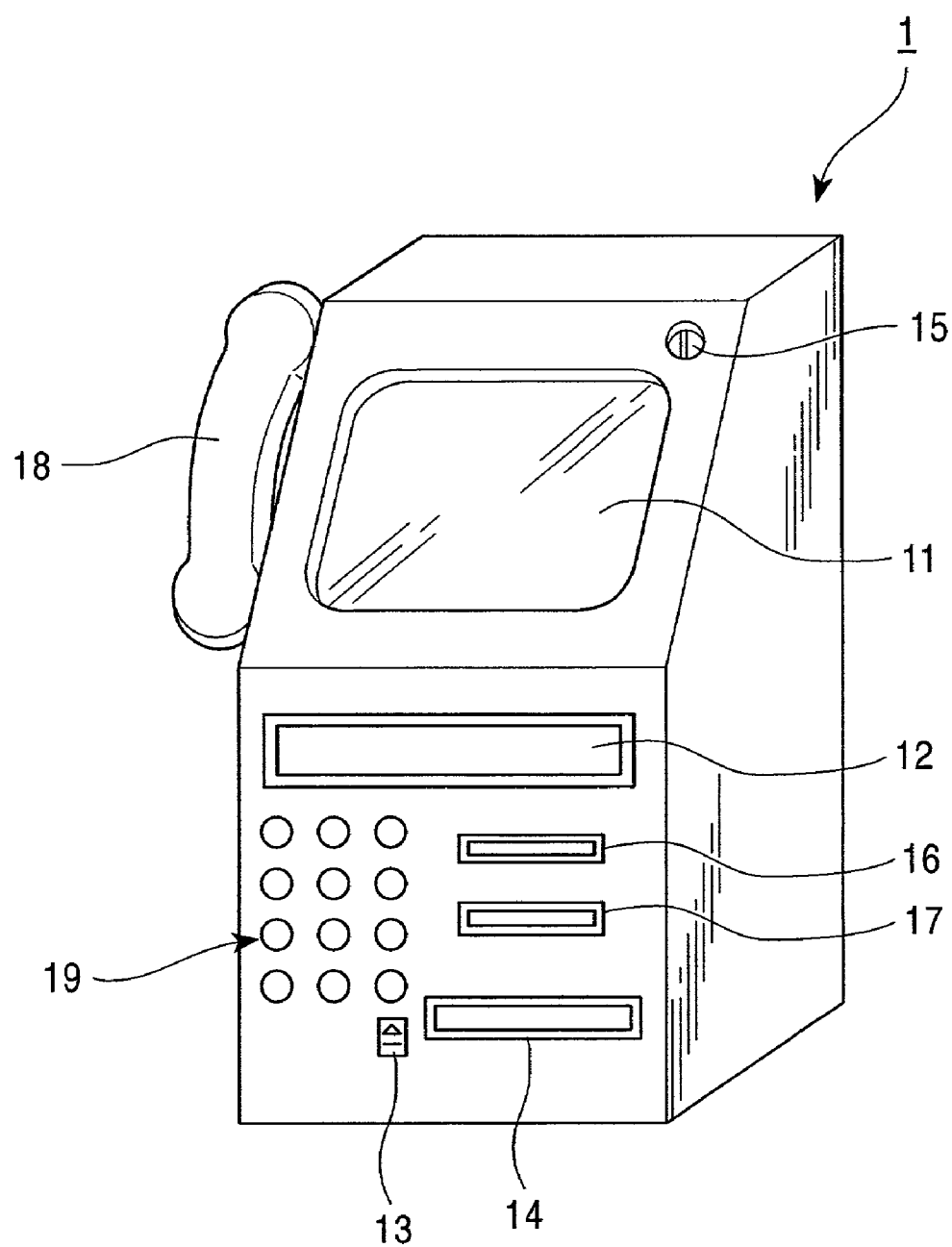
FIG. 3 is a diagram showing an external appearance of a public downloading apparatus connected to a network in the embodiment of the invention.
Figure 4:
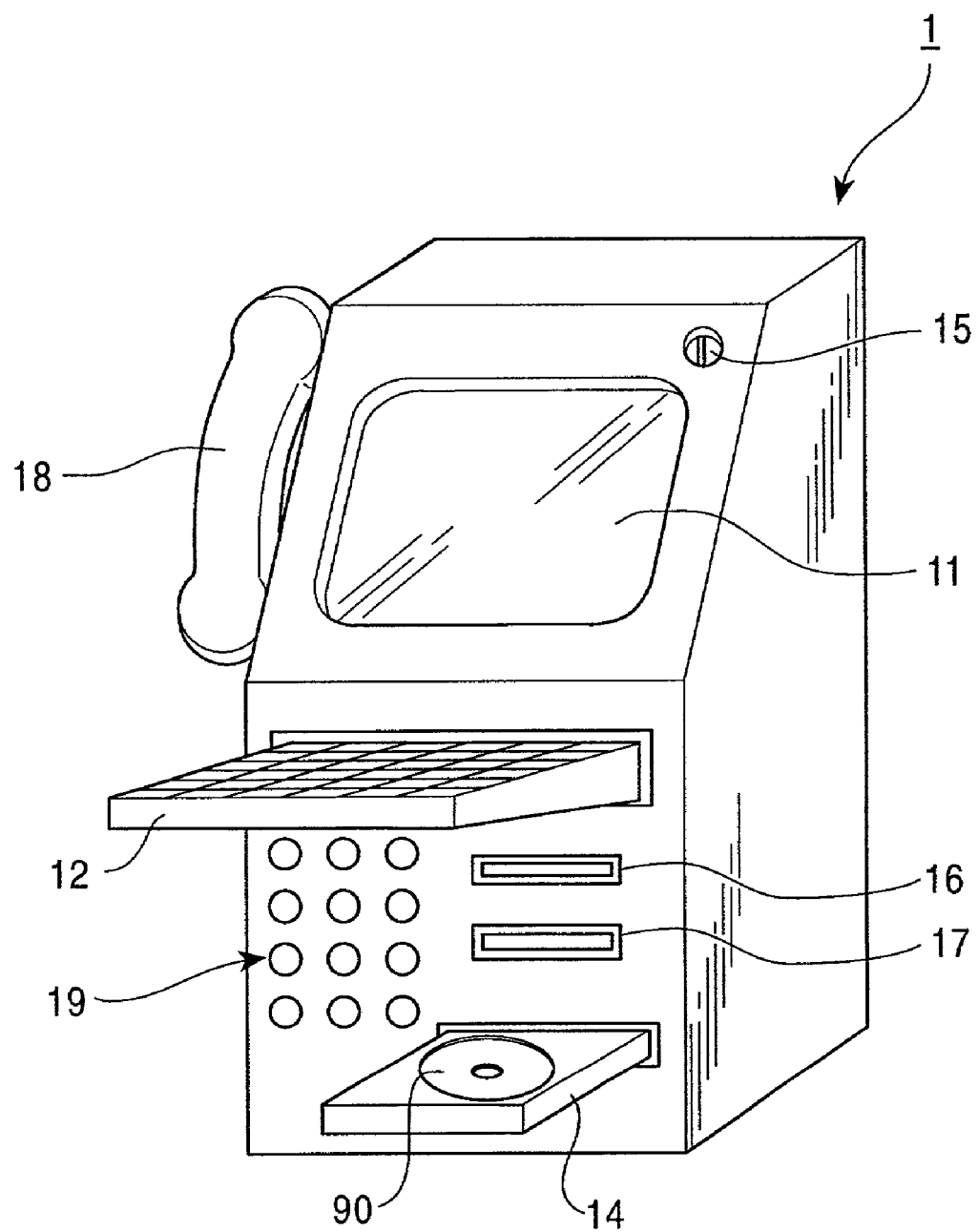
FIG. 4 is a diagram showing another external appearance of the public downloading apparatus connected to the network in the embodiment of the invention.

FIGS. 3 and 4 shows an external appearance of an example of type-B public downloading apparatus 1.

This public downloading apparatus 1 is placed in front of a store or in a like place if it is intended to for public use. For example, it resembles an ordinary public telephone in external appearance.

Referring to FIG. 3, a display 11 using a liquid crystal panel or a cathode ray tube (CRT) is formed in an upper front portion of public downloading apparatus 1. The display 11 has a screen for monitoring when public downloading apparatus 1 is used.

A keyboard 12 is provided as an input device to be operated by a user. As shown in FIG. 3, the keyboard 12 is set in an unusable state by being set in the body of public downloading apparatus 1 when not used. When the keyboard 12 is used, it is set in a usable state by being put out of the body of the apparatus, as shown in FIG. 4. In this example, the keyboard 12 is automatically put out or retracted when use of public downloading apparatus 1 is started or finished, as described below. However, the arrangement may alternatively be such that a user manually draws out or pushes in the keyboard 12 at the time of starting or finishing using public downloading apparatus 1.

At the time of use of public downloading apparatus 1, it is necessary for a user to load a disk 90 in his or her possession. A disk tray 14 is provided as a component for loading the disk 90. The disk tray 14 is ejected out of the body of the apparatus, as shown in FIG. 4, when the user presses an eject key 13. In this state, the user places the disk 90 on the disk tray 14 and again operates the eject key 13 to set the disk tray 14 in the body of the apparatus, as shown in FIG. 3. The disk 90 is thereby loaded in an internal disk drive (disk drive 24 shown in FIG. 5). Thereafter, the public downloading apparatus 1 can perform recording or reproducing operation for recording data on the disk 90 or reproducing data from the disk 90.

This public downloading apparatus 1 is arranged to enable a user to select the above-described registration payment (payment based on credit card registration) or deposition payment (payment by depositing or inserting current money, a prepaid card, or a credit card) as user fee payment mode. To enable deposition payment, a coin slot 15, a prepaid card slot 16 and a credit card slot 17 are provided, as illustrated.

This public downloading apparatus 1 is connected to the network 7 and telephone line 8 shown in FIG. 1. In particular, the public downloading apparatus 1 is connected to telephone line 8 to have a public telephone function such as to be also usable as a public telephone. Accordingly, a handset 18 and dial keys 19 are provided, as illustrated.

The public downloading apparatus 1 also has the function of the above-mentioned satellite communication unit 10 not shown in FIGS. 3 and 4.

Figure 5:
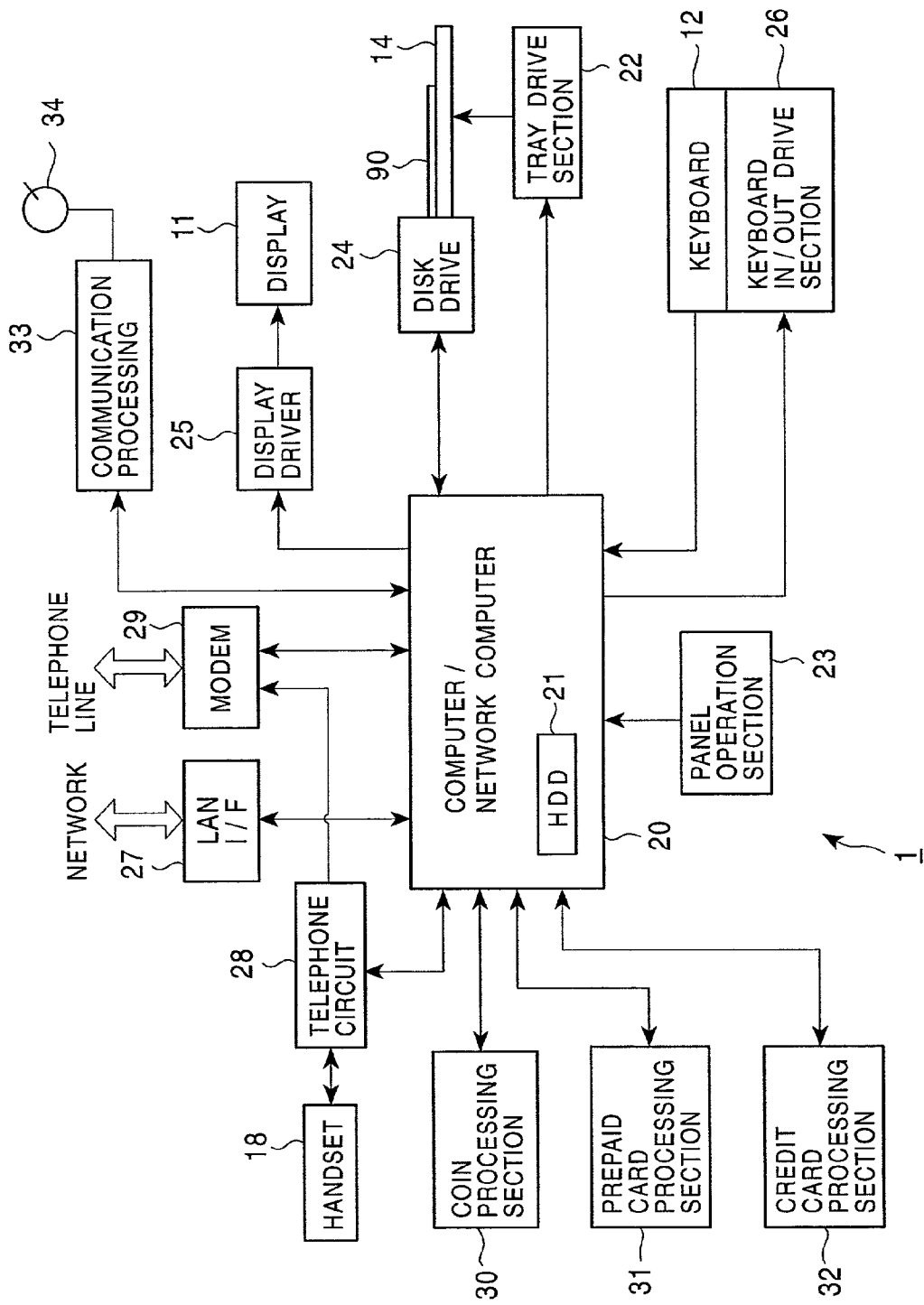
FIG. 5 is a block diagram of the public downloading apparatus connected to the network in the embodiment of the invention.

FIG. 5 shows the internal configuration of public downloading apparatus 1.

A computer and network computer section 20 (hereinafter referred to as computer 20) is a processing section for enabling public downloading apparatus 1 to function as a personal computer and to perform downloading processing. The computer 20 includes a central processing unit (CPU) for performing calculation and control processing, a random access memory (RAM) section provided as a main memory, and a read only memory (ROM) section for storing an operating system and other programs, and has a function for interfacing with other components of public downloading apparatus 1, a function for interfacing with the network 7 and telephone line 8, etc.

The computer 20 also has a hard disk drive 21 provided as an internal storage medium.

As input devices for the computer 20, a panel operation section 23 and the above-mentioned keyboard 12 are provided.

In the panel operation section 23, eject key 13 and dial keys 19 are provided, as mentioned above.

The keyboard 12 is driven by a keyboard in/out drive section 26 to be put out or retracted. The computer 20 instructs the keyboard in/out drive section 26 to put out the keyboard 12 when a user uses the apparatus. The keyboard in/out drive section 26 drives a keyboard moving motor (not shown) in accordance with this instruction. By the operation of this keyboard moving motor, keyboard moving gears (not shown) are driven, thereby moving the keyboard 12 to the usable position, as shown in FIG. 4.

When use of the public downloading apparatus 1 is finished, the computer 20 instructs the keyboard in/out drive section 26 to retract the keyboard 12. The keyboard in/out drive section 26 drives the keyboard moving motor in accordance with this instruction to retract the keyboard 12 by the operation of the keyboard moving gears, thereby setting the keyboard in the retracted position, as shown in FIG. 3.

The disk 90 is loaded by being placed on the disk tray 14 in the disk drive 24 in the above-described manner, and recording of data on the disk 90 or reproduction of data from the disk 90 is thereafter performed in the disk drive 24.

The computer 20 instructs a tray drive section 22 to eject or retract the disk tray 14 in response to pressing of the eject key 13. The tray drive section 22 drives a tray moving motor and tray moving gears (not shown) in accordance with this instruction, thereby ejecting or retracting the disk tray 14. In some event, e.g., when use of the public downloading apparatus 1 is finished, the computer 20 instructs the tray drive section 22 to eject or retract the disk tray 14 without recognizing the operation of the eject key 13.

The disk drive 24 performs recording or reproducing operation when required by the computer 20 to record data on the disk 90 loaded in the disk drive 24 or reproduce data from the disk 90.

That is, the computer 20 transmits a read command, a read position address and a data length or like data or commands to the disk drive 24, and the disk drive 24 performs reading operation in accordance with this instruction and sends read data to the computer 20. Also, the computer 20 transmits to the disk drive 24 a write command, a write position address and a data length or like data or commands, and downloadable data which is to be written, and the disk drive 24 performs a writing operation in accordance with this instruction to record (download) the transmitted information on the disk 90.

A disk 90 for a different use, e.g., for updating downloadable data may be prepared not in the possession of a user but in the possession of a provider. For example, if a need has arisen to update certain information stored in the hard disk drive 21 as downloadable data, the provider of the information (e.g., contents company 4 or the like) loads a disk prepared for updating, and updating information is read from this disk to the computer 21. In this manner, a file of downloadable information file is updated.

The display 11 displays a graphic image for a graphic user interface (GUI), as does a display of an ordinary personal computer. The computer 20 supplies a display driver 25 with information which is to be displayed, and the display driver 25 makes a display of the information on the display 11.

The public downloading apparatus 1 in this example is connected to the network 7, and therefore has a local area network (LAN) interface 27 for connection to the network 7.

Through the LAN interface 27, the computer 20 can perform data communication with each component connected to the network 7 as shown in FIG. 1.

The computer 20 is also connected to telephone line 8 by a modem 29 and is therefore capable of data communication via telephone line 8. Further, a telephone circuit section 28 and the handset 18 are provided to enable the public downloading apparatus 1 to be used as a public telephone.

When the handset 18 is unhooked, the computer 20 detects the off-hook state of the handset 18 through the telephone circuit section 28, and starts a public telephone control mode, and makes the telephone circuit section 28 make a call in accordance with an operation using dial keys 19.

After the call has been put through to the desired terminal, the computer 20 makes the telephone circuit section 28 execute the ordinary telephone communication operation, thus enabling the public downloading apparatus to function as a public telephone.

To realize a function corresponding to that of satellite communication unit 10, a communication processing section 33 and an antenna section 34 are provided.

The computer 20 makes the communication processing section 33 execute processings such as modulation and amplification of a signal representing necessary information which is to be transmitted (data request or the like), and transmits the processed signal as a communication output from the antenna section 34, thus enabling the desired communication with a server system having satellite communication unit 10, e.g., the public downloading apparatus management company 2.

Information transmitted from a server system having satellite communication unit 10 is received by the antenna section 34 and extracted by demodulation in the communication processing section 33. In this manner, commands or the like can be received from a server system having satellite communication unit 10, or information (a content of a medium, etc.) provided to be downloaded is taken from such a server system to be stored in the hard disk drive 21.

This public downloading apparatus 1 has a coin processing section 30 for the above-mentioned adaptation to the deposition payment system. The coin processing section 30 performs fee collection processing with respect to coins deposited through the coin slot 15.

A prepaid card processing section 31 performs fee collection processing with respect to a prepaid card inserted in the prepaid card slot 16. For example, the prepaid card processing section 31 performs processing for updating magnetic data on the prepaid card and punching the card or the like according to a collected fee.

When payment is done by deposition of coins or by using a prepaid card, the computer 20 transmits information about the payment to the public telephone management company 6 via telephone line 8.

The credit card processing section 32 reads information from a credit card inserted in the credit card slot 17, and supplies the information to the computer 20. In this case, the computer 20 transmits credit card information (card number) and fee information to the credit card company 3 via telephone line 8.

Type-B public downloading apparatus 1 is constructed as described above, for example. It is not always necessary for type-B public downloading apparatus 1 to have all the above-described components, and type-B public downloading apparatus 1 may have components other than those illustrated. For example, in the case of one of possible type-B public downloading apparatuses 1 not adapted to the credit card payment system, there is no need for the credit card slot 17 and the credit card processing section 32. Needless to say, if the public telephone function is not added, the handset 18 and the telephone circuit section 28 are unnecessary.

As an example of an additional component, a printer section may be provided to output a print when public downloading apparatus 1 is used. For example, contents and a name of downloaded information and other related information may be printed to be presented to a user. Needless to say, a printing unit formed separately from public downloading apparatus 1 may be connected to public downloading apparatus 1.

A mouse may be provided as an input device along with the keyboard 14. The mouse may be an ordinary mouse operated on a desk top or the like or a so-called air mouse which is held in a user's hand to be operated by being spatially moved, and which is capable of inputting operational information corresponding to a two-dimensional or three-dimensional movement with, for example, an angular velocity sensor, an acceleration sensor or a gravity sensor.

The apparatus may also be provided with a CD-ROM (compact disk read only memory) drive.

Further, the apparatus may be provided with a power amplifier and a speaker to enable a user to listen to music or the like provided as a content of a music medium in the place where the public downloading apparatus 1 is installed.

The construction of type-A public downloading apparatus 1 is such that the functional sections for connection to telephone line 8 is removed from the above-described type-B public downloading apparatus. That is, type-A public downloading apparatus 1 is constructed without handset 18 and telephone circuit section 28. In some case, it is constructed without credit card slot 17 and credit card processing section 32.

If public downloading apparatuses 1 are used free of charge regardless of whether the apparatus is of type A or B, there is, of course, no need for coin slot 15, coin processing section 30, prepaid card slot 16, prepaid card processing section 31, credit card slot 17 and credit card processing section 32.

II-2 Disk

Disk 90 used in the downloading system of this embodiment as a recording medium in the possession of a user will next be described.

Preferably, disk 90 used in the downloading system of this embodiment is a disk on which data can be written and which has a read only area in which data cannot be written. Therefore, a RAM disk such as shown in FIG. 6A or a partial ROM disk such as shown in FIG. 6B or 6C is used as disk 90.

Figure 6A:
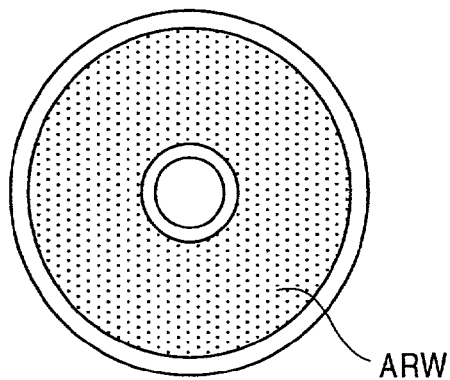
FIGS. 6A, 6B, and 6C are diagrams showing disks usable in the downloading system of the embodiment of the invention.

The RAM disk shown in FIG. 6A has, for example, a magneto-optical region or a phase change region forming a rewritable area ARW for recording and reproduction corresponding to its entire main data area. In the case of this RAM disk, since the entire main data area is formed as a physically writable area, there is a need to set a non-rewritable data recording area in the entire data area. Such a non-rewritable area is formed by write-protecting some writable area with disk management information.

Figure 6B:
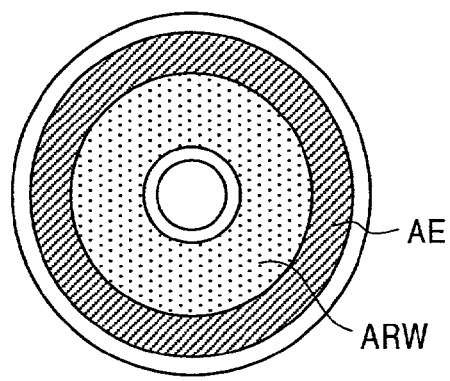
Figure 6C:
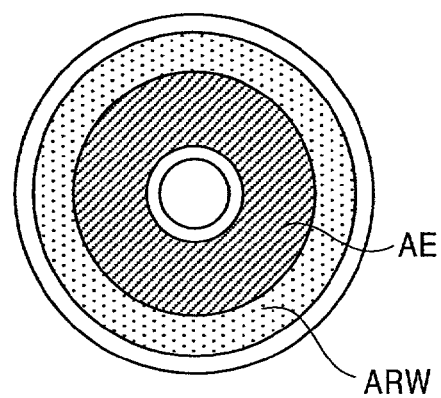

A partial ROM disk is, for example, a disk having the structure shown in FIG. 6B or 6C. That is, a partial ROM disk has a ROM area AE and a rewritable area ARW defined in its main data area.

ROM area AE is an area where data is recorded by forming embossing pits or the like. That is, it is an area where it is impossible to rewrite data even in terms of physical rewritability. Such a partial ROM disk is most favorably used as a recording medium for the downloading system of this embodiment, which should be a disk on which data can be written and which has: a non-data-writable area.

Figure 7:
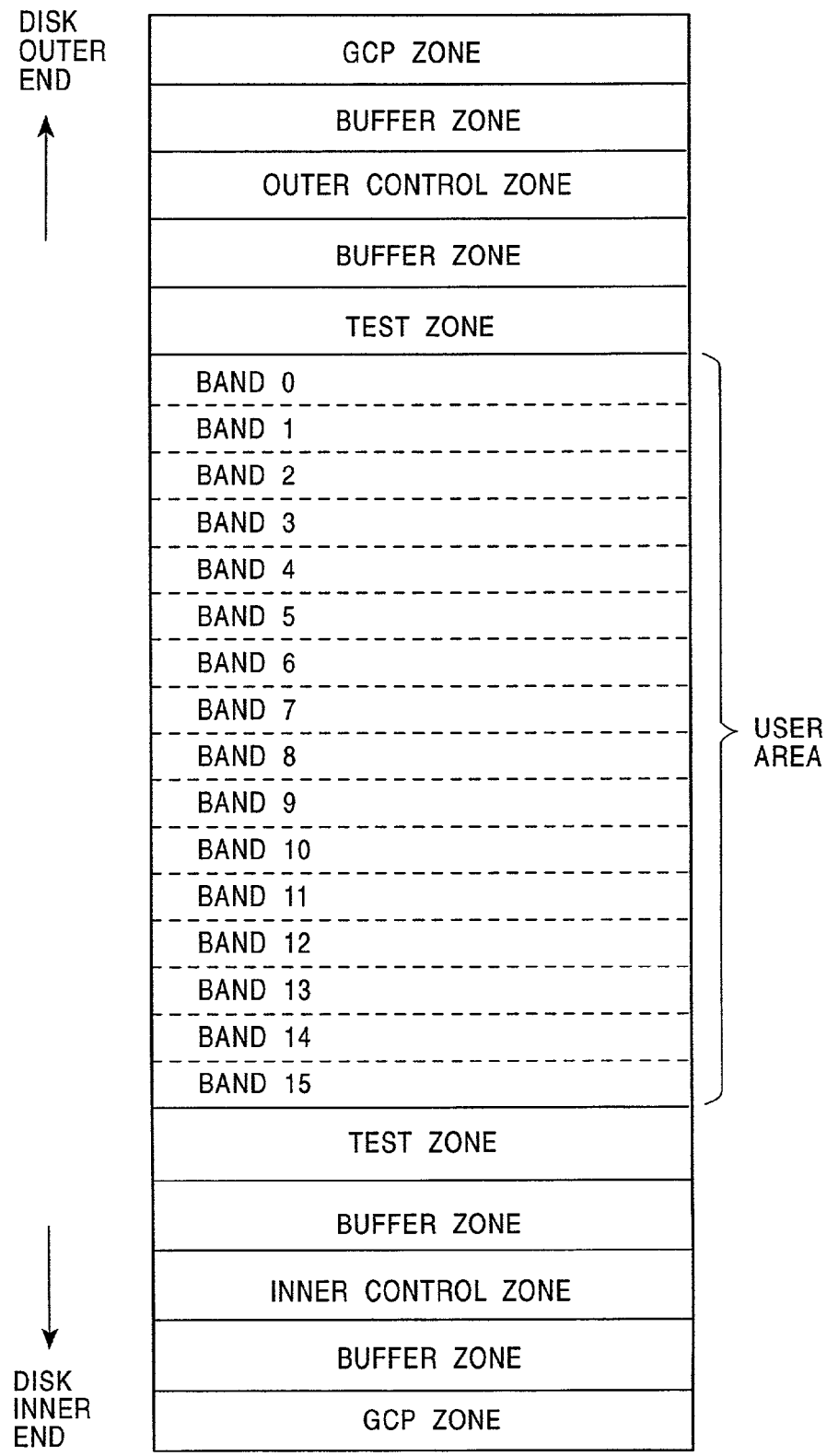
FIG. 7 is a diagram of area allocation on a disk in the embodiment of the invention.

FIG. 7 shows an example of area allocation from an outermost area to an innermost area common to the disks shown in FIGS. 6A to 6C as recording mediums used in this embodiment.

For example, a gray code part (GCP) zone is provided at the outer end of the disk, and a buffer zone, an outer control zone, another buffer zone and a test zone are successively formed toward the inner end.

Inside the test zone, a user area formed of a rewritable area ARW in which data can be recorded according to user's need and/or a ROM area AE for reproduction only is formed as a main data area. The user area is divided into sixteen bands 0 to 15.

In the RAM disk shown in FIG. 6A, the entire user area is formed as rewritable area ARW, and one band or a plurality of hands are treated as a read only area where writing is inhibited.

In the partial ROM disk shown in FIG. 6B or 6C, some of the bands 0 to 15 form ROM area AE with embossing pits and the others form rewritable area ARW such as a magneto-optical area.

The number of bands forming rewritable area ARW in the sixteen bands and the number of bits forming ROM area AE can be set as desired on the manufacturer side.

In the examples of the disk shown in FIGS. 6B and 6C, rewritable area ARW and ROM area AE are formed separately from each other in inner and outer areas in the user area. However, each of rewritable area ARW and ROM area AE may be formed in such a manner that one or more of its bands are not adjacent to the others.

A test zone, a buffer zone, an inner control zone, another buffer zone and a GCP zone are provided inside the user area.

Each of the GCP zones, the outer control zone and the inner control zone formed outside and inside the user area is used as a management area in which predetermined control information is recorded.

On disk 90 formed as a partial ROM disk or a RAM disk as described above, information such as shown in FIG. 8 is recorded at the time of use of public downloading apparatus 1.

Figure 8:
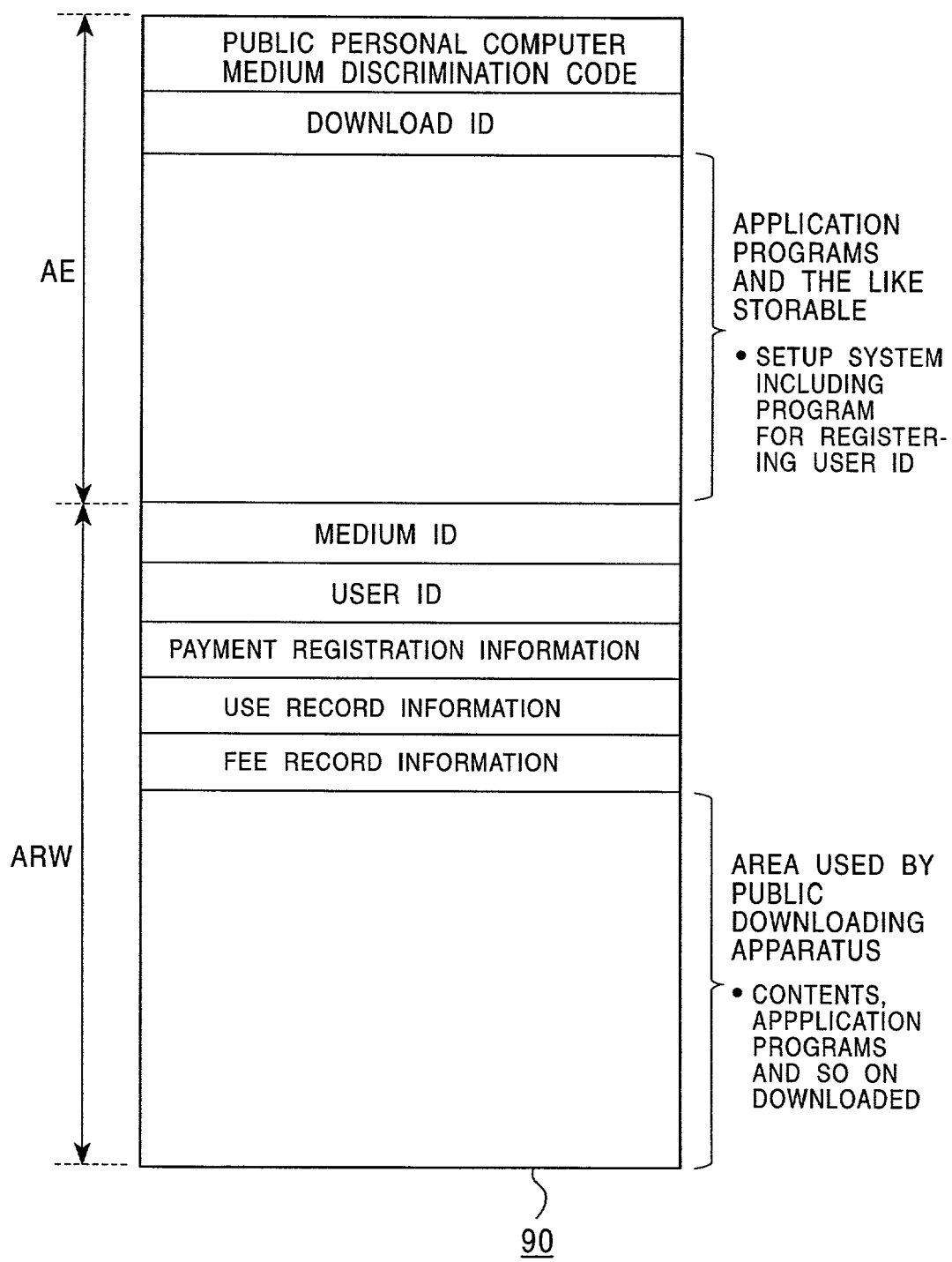
FIG. 8 is a diagram showing information recorded on the disk in the embodiment of the invention.

An upper section of FIG. 8 corresponds to ROM area AE of a user area of a partial ROM disk (or a write-protected area of a RAM disk) while an lower section of FIG. 8 corresponds to rewritable area ARW of the user area. Information to be recorded in each of these areas is shown in the corresponding section.

While in this example the user area is formatted to record information, the management area, e.g., the above-mentioned control zone may be formatted to record the information shown in the illustration. Also, the format shown in FIG. 7 is only and example and it is not always necessary to format disk 90 as shown in FIG. 7.

In ROM area AE of disk 90 (or write-protected area), i.e., the area where recorded data cannot be rewritten by a user, a discrimination code is recorded, with which the medium is identified as one adapted to public downloading apparatus 1. Disk 90, if formed as a partial ROM disk, is manufactured with such a discrimination code recorded as embossing pits.

A download ID is also recorded in this ROM area AE (or write-protected area).

The download ID is a code number (or a downloaded file name) for identifying particular information downloaded to the disk 90.

Sorts of information downloadable in this embodiment are, for example, an electronic publication and music software. For example, a code enabling identification of one of such genres of information or a kind of publication is recorded as a download ID. For example, a code for a certain publication, e.g., a newspaper "*" or a weekly magazine "*" or a code for a genre of information such as "newspaper" or "music software" is set and recorded.

A content of a medium downloadable to a disk can be specified by such a download ID. For example, disk 90 can be used only for downloading an electronic newspaper published by a newspaper publishing company if it has the corresponding download ID "X" recorded thereon.

A plurality of (a plurality of types of) download IDs may be recorded on one disk 90 for such a purpose. Also, an ID structure may be formed in which IDs are classified with respect to genres or names such as those mentioned above.

A rewritable download ID is possible if it is recorded in rewritable area ARW instead of being recorded in ROM area AE (while some or no download ID is recorded in ROM area AE).

A medium ID is recorded in rewritable area ARW of disk 90.

The medium ID is a code corresponding to a disk serial number. That is, immediately before disks 90 are shipped, disks 90 are serially numbered. Each disk 80 has one code number different from others.

The medium ID is not only written on disk 90 but also attached as a code number to, for example, a package for disk 90 to enable a user to know the medium ID number after purchasing the disk.

In rewritable area ARW, an area for recording a user ID is prepared. A user who purchased disk 90 freely sets a numerical value or sequence of letters as a user ID and records this user ID in the user ID area. This user ID is a personal identification number for enabling the user to use public downloading apparatus 1 with the disk 90 on which the user ID is recorded. That is, only the user who knows the personal identification number can use the disk 90.

Recording of a user ID on disk 90 can be executed by a user using public downloading apparatus 1 as described below. Alternatively, for example, a user may record a user ID through a personal computer in his or her possession.

In rewritable area ARW, an area for recording a payment registration information is also prepared. In this area, information is recorded that credit card payment registration for enabling a user to perform registration payment has been made in the public downloading apparatus management company 2, and that the user can perform registration payment with respect to use of the disk having this information. This payment registration information can be recorded from public downloading apparatus 1 or a personal computer in the possession of the user, for example.

For example, the following process may be performed. A user has his or her credit card registered by a procedure described below, and the public downloading apparatus management company 2 thereafter sends a registration number to the user. The user loads disk 90 in public downloading apparatus 1 and inputs the registration number to the apparatus. Then, collation processing is performed between the public downloading apparatus 1 and the public downloading apparatus management company 2. If the result of the collation processing is OK, information that registration payment can be performed with respect to the disk is recorded on the disk.

Further, in rewritable area ARW, use record information and fee record information are recorded.

Use record information is information about details of use of public downloading apparatus 1 recorded each time public downloading apparatus 1 is used with disk 90. Each time use of public downloading apparatus 1 is finished, the contents of use record information are updated (a new use record is added) by public downloading apparatus 1.

For example, use record information such as shown in FIG. 9 may be recorded. FIG. 9 shows an example of information added each time public downloading apparatus 1 is used.

First, a time when use of public downloading apparatus 1 is started (month, day, year, hours, minutes, seconds) is recorded. For recognition of the public downloading apparatus 1 used, a public downloading apparatus number set in the public downloading apparatus 1 is written.

A time when use of the public downloading apparatus is finished (month, day, year, hours, minutes, seconds) is also recorded.

Information such as that indicated by "○" on the left-hand side of FIG. 9 is recorded as a detail of actual use of public downloading apparatus 1.

For example, when a user downloads to disk 90 in his or her possession an application program or the like installed in hard disk drive 21 of public downloading apparatus 1 or downloaded from the application company 5 or the like via the network, a name of the downloaded application program is recorded.

The source or medium (not shown) from which the downloaded application program may also be recorded. That is, information as to whether the download application program is one installed in hard disk drive 21 or downloaded via the network 7 or the like (a name of a provider, etc.) is recorded.

When the user downloads to disk 90 in his or her possession a data file stored in hard disk drive 21 of public downloading apparatus 1 or downloaded via the network, a name of the downloaded data is recorded. Needless to say, the source of the data may also be recorded. A data file, distinguished particularly from contents in this description, is, for example, a data file received as an electronic mail.

When the user downloads to disk 90 in his or her possession a content of a medium stored in hard disk drive 21 of public downloading apparatus 1 or a content downloaded from the contents company or the like via the network, a name of the downloaded content is recorded. Needless to say, the source of the content may also be recorded.

Each of the contents of information downloaded by a user using public downloading apparatus 1 in the above-described manner is recorded in use record information.

Needless to say, information about a plurality of contents of the same kind may be recorded. For example, if a plurality of application programs are downloaded to disk 90, each of names of the application programs is recorded.

Fee record information is information about a fee to be paid each time public downloading apparatus 1 is used with disk 90. Each time use of public downloading apparatus 1 is finished, the contents of fee record information are updated (a new fee record is added) by public downloading apparatus 1.

For example, fee record information such as shown in FIG. 10 may be recorded. FIG. 10 shows an example of information added each time public downloading apparatus 1 is used.

First, for recognition of public downloading apparatus 1 used, a public downloading apparatus number set in the public downloading apparatus 1 is written.

As a fee paid for use of public downloading apparatus 1, a public downloading apparatus use fee is recorded. If use of public downloading apparatus 1 is charged for with respect to the time period through which the apparatus is used, the use time period is recorded along with the use fee.

A payment method selected at the time of use of the apparatus is also recorded. That is, information which denotes registration payment or deposition payment is recorded. In the case of deposition payment, information which denotes payment in coin or with a prepaid card or a credit card is also recorded.

Further, as details of charging according to actual use of the public downloading apparatus, information such as that indicated by "○" on the left-hand side of FIG. 10 is recorded.

Downloading by a user of an application program, data, a content of a medium or the like to disk 90 in the possession of the user is regarded as purchase of software.

Accordingly, if a user downloads an application program, data, a content of a medium or the like, and if the program, data or content is provided for pay, a downloading fee (purchase fee) is recorded.

The source (not shown) of the downloaded application program, data or content may also be recorded along with the fee for downloading of the application program, data or content.

Details of charging, such as those described above, when a user uses public downloading apparatus 1 and executes downloading, are recorded in fee record information. Needless to say, information items designating a plurality of record contents of the same category may be recorded. For example, if a plurality of application programs are downloaded to disk 90, a fee for downloading of each application program is recorded.

Rewritable area ARW shown in FIG. 8 is prepared to enable recording of at least a medium ID, a user ID, payment registration information, use record information and fee record information, as described above.

Of these sorts of information recorded in rewritable area ARW, the group of information other than payment registration information needs to be protected from being freely rewritten by a user. A medium ID is maintained under write protection to be prevented from being rewritten. Preferably, a user ID is prevented from being rewritten after being written. Only public downloading apparatus 1 can update use record information and fee record information. In some case, it is preferable to prevent rewriting of payment registration information after writing it.

Management of these sorts of information may be realized in such a manner that all or part of a medium ID, a user ID, payment registration information, user record information and fee record information are checked and held as files normally inaccessible (files concealed from a user) according to the forms of the files on disk 90 under management and a program for disk management provided in the public downloading apparatus 1.

To improve security of disk 90 itself, i.e., to eliminate a possibility of unauthorized use of disk 90, all or part of a medium ID, a user ID, payment registration information, use record information and fee record information are recorded after being enciphered.

While a user ID has been described as a personal identification number for use of public downloading apparatus 1, a password is set as another personal identification number if registration payment based on credit card registration is performed. The password, described below in detail, is not recorded on disk 90.

Information to be recorded in ROM area AE (or write-protected area) and rewritable area ARW of disk 90 is set as described above. The part of rewritable area ARW other than the part in which this information is recorded is used by public downloading apparatus 1.

That is, the remaining area is used as an area for storing a content of a medium, data, an application program or the like downloaded from public downloading apparatus 1.

ROM area AE may be limited to the area for a discrimination code. However, ROM area AE other than that for a discrimination code may be set to record a setup system or the like.

For example, in using a partial ROM disk or a RAM disk as disk 90, there is a need to execute formatting on the user side to perform defect area management and to form file management information. In such a case, however, if a formatting program (setup system) for executing such formatting is recorded on the disk 90, the disk 90 can be formatted even if public downloading apparatus 1 or a personal computer in the possession of a user has no suitable formatting program.

A user ID, which a user is required to input, can be written, for example, in a personal computer in the possession of the user as well as in public downloading apparatus 1 if a program for writing the user ID is previously recorded.

As a free offering to a purchaser of disk 90, application programs may also be recorded in the form of bundled software.

Disk 90 may be contained in a cartridge to be prevented from being scratched.

A disk has been described as an example of the recording medium of this embodiment. However, a different kind of writable recording medium, e.g., an IC card can be used instead of the disk.

If an IC card is used, the downloading time can be markedly reduced since the data writing speed of the IC card is much higher than that of disk recording mediums.

For example, a downloading system can be formed in which, when a user loads an IC card in public downloading apparatus 1, information designated with a download ID is downloaded in an instant.

Another mode of use of a recording medium in the possession of a user is conceivable in which an IC card is loaded in a small portable terminal. In such a case, to download various sorts of information to the internal IC card, the portable terminal may be provided with a plug for connection to public downloading apparatus 1 or may be connected to public downloading apparatus 1 in a cable connection manner. Also, a flash memory or the like is provided in the portable terminal to store the above-described discrimination code, download ID, medium ID, user ID, payment registration information, use record information, fee record information, etc.

II-3 Use Procedure

The procedure of use of public downloading apparatus 1 executed by a user with the above-described disk 90 will now be described.

Figure 11:
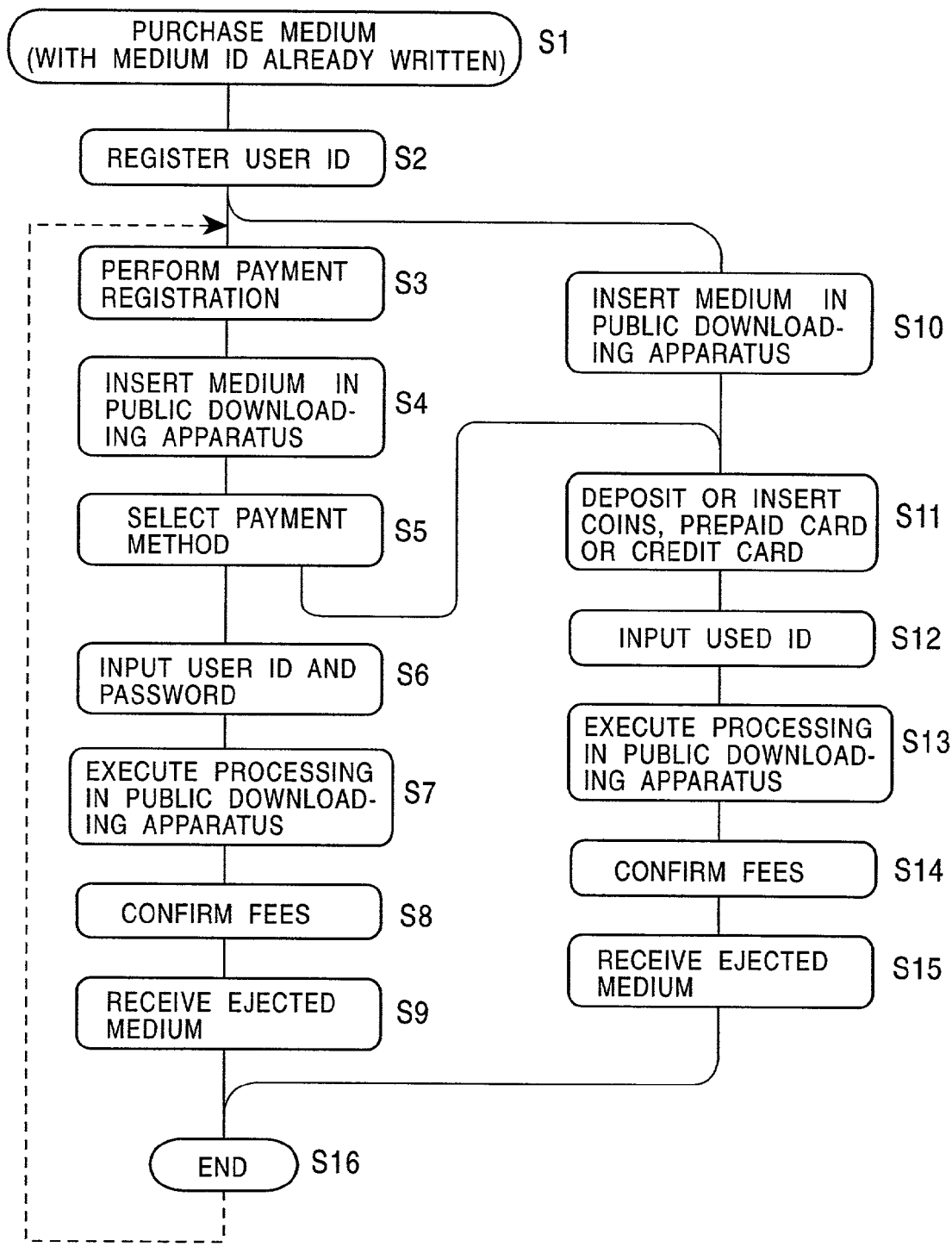
FIG. 11 is a diagram for explaining the procedure in which a user uses the downloading system of the embodiment of the invention.

FIG. 11 shows steps of use by a user. In step Si, a user is required to obtain disk 90. Disk 90 obtained by the user has a medium ID (disk serial number) written thereon, as described above. The user can know the medium ID from a label or the like attached to the package of the disk.

A download ID, designating a certain sort of information, is prepared to enable the information to be downloaded without a selecting operation performed by a user, as described below. Since such an ID is recorded on each of purchasable disks, a user can select and purchase one of the disks on which the download ID corresponding to the sort of information which he or she needs is recorded.

However, this does not means that information designated with no download ID on one disk 90 cannot be downloaded to the disk 90 (while it is, of course, possible to construct the downloading system so that such information cannot be downloaded). Any information can be downloaded by a downloaded information selecting operation described below.

After obtaining disk 90, the user writes a user ID on disk 90 in step S2 before actually performing downloading.

For example, after loading disk 90 in certain public downloading apparatus 1, the user inputs a user ID in the form of a sequence of numerical or other characters that the user has freely selected. The public downloading apparatus 1 records, as a user ID, the input sequence of numerical or other characters in the predetermined area of disk 90.

After recording of the user ID has been completed, use of public downloading apparatus 1 with registration payment from step S10 can be started. However, if the user wishes to perform registration payment based on card registration with respect to payment of a fee for use of the public downloading apparatus and other fees, the user is required to complete payment registration in step S3.

Figure 12:
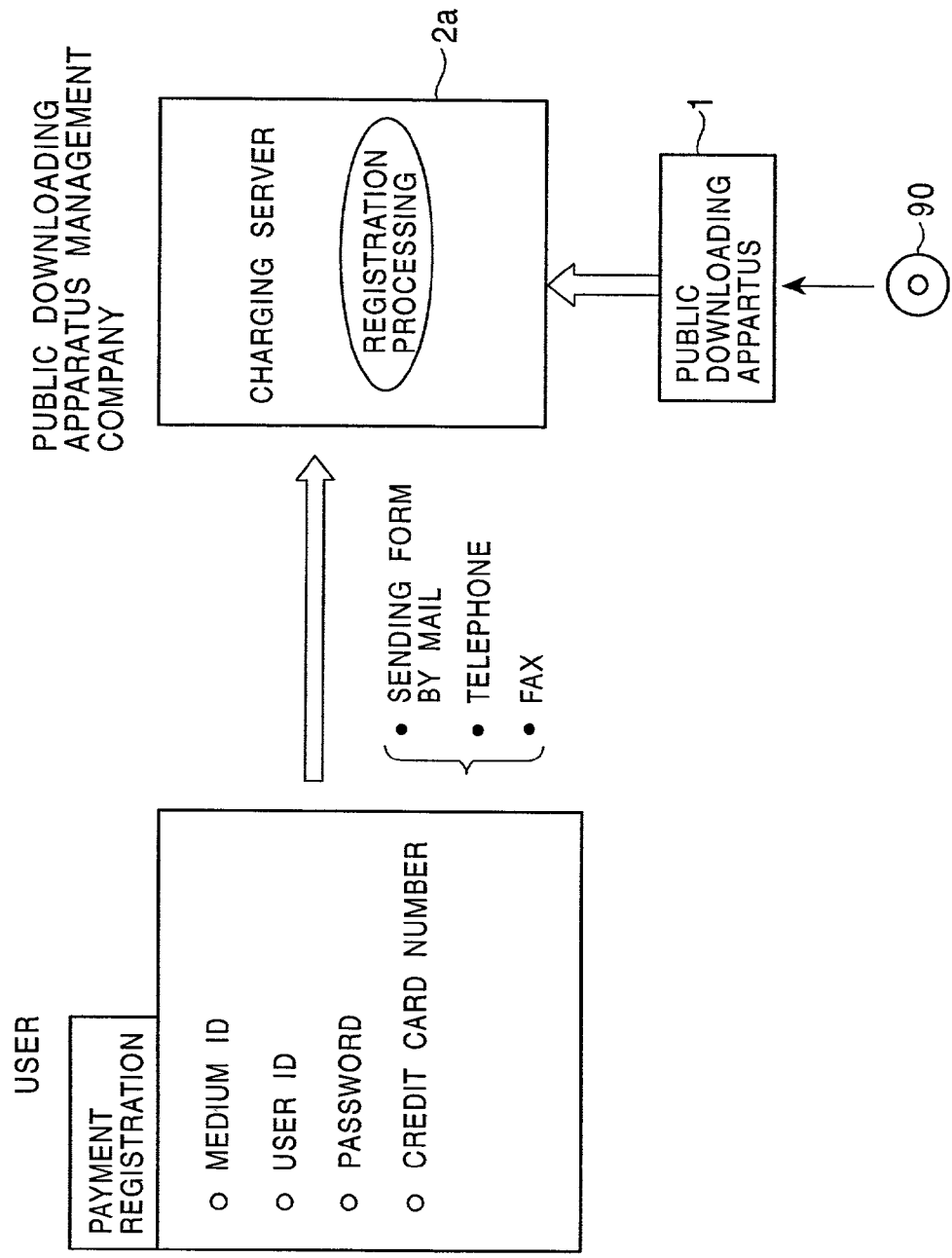
FIG. 12 is a diagram for explaining a credit card registration procedure in the embodiment of the invention.

Payment registration made in step S3 will be described with reference to FIGS. 12 and 13.

The user enters the medium ID, the user ID, a password and a credit card number on a certain medium, e.g., a registration form which the user has received as an appendix at the time of purchasing the disk. The user enters the medium ID by reading it from the label attached to the package for the disk 90. The medium ID may be previously entered in the registration form. The user ID entered is a code which A is set in step S2. The password is a personal identification number for registration payment, which is set by the user at the time of this registration.

After entry of these information items, the user sends the registration form to the public downloading apparatus management company 2 by mail. Alternatively, the user may inform the public downloading apparatus management company 2 of these information items by telephone or by using a facsimile machine.

In the public downloading apparatus management company 2, the charging server 2a performs registration processing based on the contents of information sent by mail or telephone.

For example, in the charging server 2a, a medium ID, a user ID, a password and a credit card number are registered with a registration number indicated by #n in FIG. 13 as registration contents with respect to each of a number of users.

After execution of such registration, information that registration payment is allowed with respect to the disk 90 is recorded as payment registration information on the disk 90.

This payment registration information may be recorded as described below. When the registration number sent from the public downloading apparatus management company 2 is input after loading the disk 90 in the public downloading apparatus 1 as described above, processing for collation of the medium ID and so on is performed between the public downloading apparatus 1 and the public downloading apparatus management company 2 (e.g., collation between the medium ID recorded on disk 90 and the medium ID registered as shown in FIG. 13). If the result of collation is OK, information that registration payment is allowed with respect to the disk 90 is recorded.

Alternatively, the user may instruct, for example, public downloading apparatus 1 to record, without such particular collation, information that registration payment is allowed with respect to the disk 90.

If the user wishes to purchase another disk 90 and to perform registration payment with respect to this disk 90 by using the same user ID and password, the user can register this payment by using public downloading apparatus 1 as well as by mailing the form, by telephone or by using a facsimile machine. Preferably, in such a case, the user only input, as user ID and password, the same numbers as those in the former registration without transmitting the credit card number (not input by the user) via the network. Since public downloading apparatus 1 may only read the medium ID on the disk 90 in such a case, it is not necessary for the user to input the medium ID.

After completing payment registration in step S3, the user can use public downloading apparatus 1 from step S4.

That is, in step S4, the user brings the disk 90 to the place where public downloading apparatus 1 is installed and loads the disk 90 in the public downloading apparatus 1.

At this time, the user can select registration payment or deposition payment as a fee payment method.

If registration payment is selected in step S5, the user inputs, in step S6, two personal identification numbers, i.e., the user ID and password at a request from the public downloading apparatus 1.

From this input, collation processing described below in detail is started with respect to the input user ID and password, the medium ID and user ID which are information recorded on the loaded disk 90, and the medium ID, user ID and password registered on the charging server 2a side. A determination is made on the charging server 2a side as to whether the conditions for use are satisfied.

If the result of this collation processing performed as use condition confirmation is OK, the user can execute downloading to the disk 90 by using the public downloading apparatus 1 in step S7.

When the user gives the public downloading apparatus 1 a command to finish processing, the public downloading apparatus 1 presents a fee as a result of use of the public downloading apparatus 1. The user confirms the fee in step S8. The user takes the disk 90 unloaded from the disk tray 14 in step S9 to finish the process of using the public downloading apparatus 1 one time (step S16).

On the other hand, even if the user has not registered for payment, he or she can use the apparatus by performing step S10 and other subsequent steps after completing step S2.

That is, in step S10, the user brings the disk 90 to the place where public downloading apparatus 1 is installed and loads the disk 90 in the public downloading apparatus 1.

Since information that registration payment is not allowed with respect to the disk 90 is not recorded as payment information on the disk 90, the public downloading apparatus 1 requests the user to deposit or insert coins, a prepaid card or a credit card for deposition payment processing. In step S11, the user deposits or inserts coins, a prepaid card or a credit card.

If deposition payment is selected in step S5, the process also moves to step S11.

Thereafter, at a request from the public downloading apparatus 1, the user inputs the user ID, i.e., the personal identification number, in step S12. Since the password is a personal identification number for registration payment, the password is unnecessary in this case.

From this user ID input, processing for collation between the input user ID and the user ID information recorded on the loaded disk 90 is started and a determination is made on the public downloading apparatus 1 side as to whether the condition for use is satisfied.

If the result of this collation processing performed as use condition confirmation is OK, the user can execute downloading to the disk 90 by using the public downloading apparatus 1 in step S13.

When the user gives the public downloading apparatus 1 a command to finish processing, the public downloading apparatus 1 presents a fee as a result of use of the public downloading apparatus 1. The user confirms the fee in step S14. The user takes the disk 90 unloaded from the disk tray 14 in step S15 to finish the process of using the public downloading apparatus 1 one time (step S16).

A user can use public downloading apparatus 1 by using purchased disk 90 based on the above-described process, for example.

II-4 Processing in Public Downloading Apparatus

Processing executed by the computer 20 of public downloading apparatus 1 (and by the network) to realize use of public downloading apparatus 1 based on the above-described process and to execute various kinds of processing according to user's need will next be described with reference to FIGS. 14 to 19.

Public downloading apparatus 1 is set in a standby state such as shown in FIG. 3 in an installation place. When a user loads disk 90 in the public downloading apparatus 1, processing shown in FIGS. 14 to 18 is started.

To load the disk 90, the user ejects the disk tray 14 by operating the eject key 13. When the user again presses the eject key 13 (or pushes the disk tray 14) after placing the disk 90 on the disk tray 14, the computer 20 causes the disk tray 14 to retract, thereby enabling recording on the disk 90 or reproduction from the disk 90 to be performed with the disk drive 24.

Figure 14:
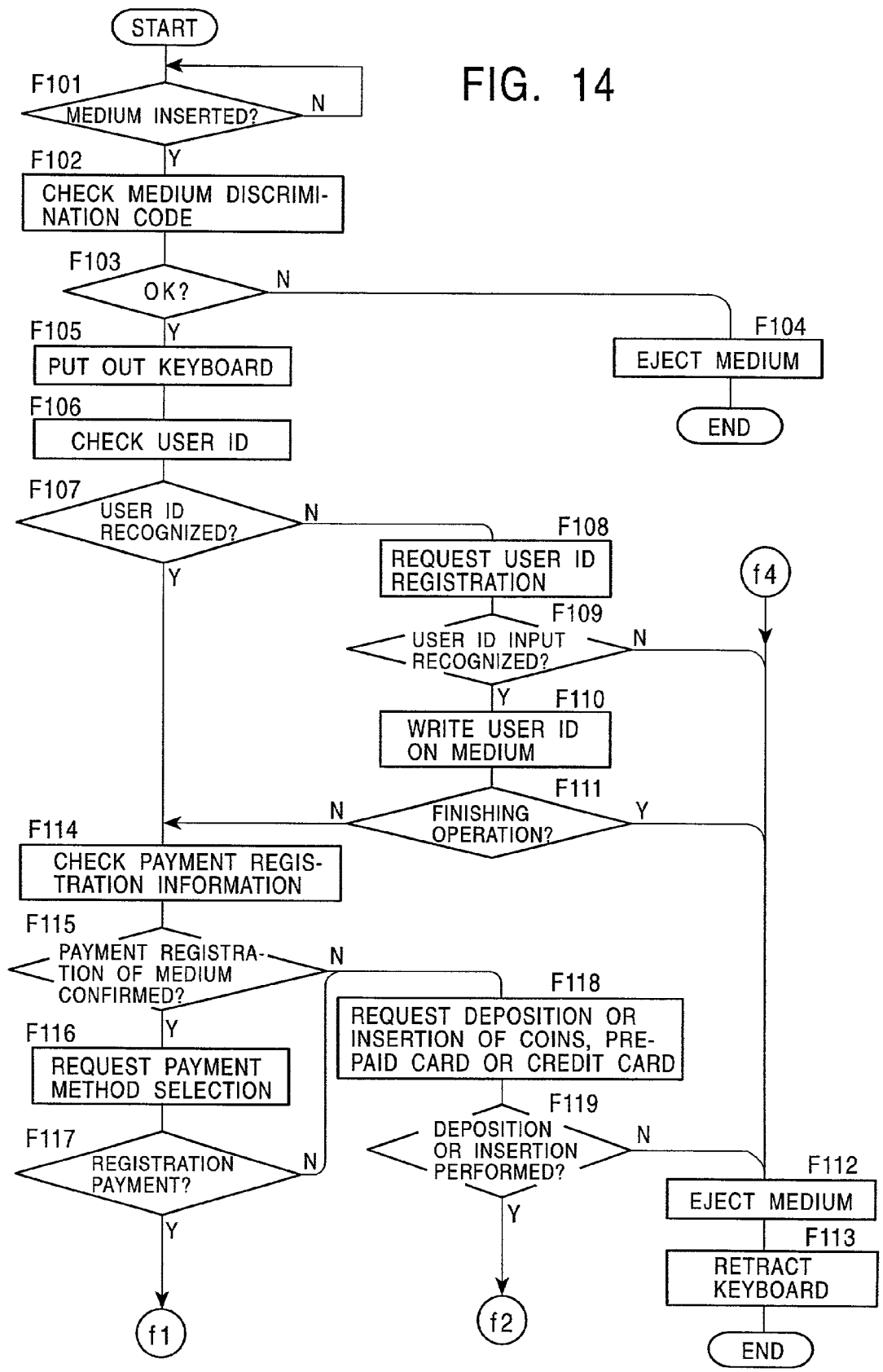
FIG. 14 is a flowchart of processing in the public downloading apparatus connected to the network in the embodiment of the invention.

After this disk inserting operation, the computer 20 advances the process from step F101 to step F102 as shown in FIG. 14.

In step F102, the computer 20 instructs the disk drive 24 to read the discrimination code from the disk 90, and checks the discrimination code. That is, the computer 20 checks the discrimination code as to whether the disk 90 is suitable for use with the public downloading apparatus 1.

If reading of the proper discrimination code results in failure, the computer 20 determines that the disk 90 does not match the use with the public downloading apparatus 1. The computer 20 then advances the process from step F103 to step F104 to instruct the tray drive section 22 to eject the disk tray 14, thereby ejecting the disk and terminating the process.

If the proper discrimination code is recognized, the computer 20 advances the process from step F103 to step F105 to instruct the keyboard in/out drive section 26 to put out the keyboard 12. The keyboard 12 is thereby moved to the usable position, as shown in FIG. 4.

Next, in step F106, the computer 20 checks information on the loaded disk 90 as to whether a user ID is written. This checking is performed for determination as to whether the user has completed step S2 shown in FIG. 11.

If the disk 90 has a user ID recorded thereon, that is, if step S2 is completed, the computer 20 advances the process to step F114.

A case where no user ID has been recorded on the disk 90 corresponds to a case where the user has neglected to execute step S2 or a case where user loads the purchased disk 90 in the public downloading apparatus 1 to execute step S2.

Therefore, the computer 20 advances the process from step F107 to step F108 to start processing for registration of a user ID on the disk 90, i.e., processing for performing step S2 in the public downloading apparatus 1.

In step F108, the computer 20 requests the user to register his or her user ID. That is, the computer 20 makes on the display 11 a display of information that user ID registration will be started, requests the user to input the user ID which is a code freely selected as a personal identification number, and waits for an input for a predetermined time period.

If the user inputs no user ID, or, for example, if the user performs a finishing operation or if no user ID is input in the predetermined time period, the computer 20 advances the process from step F109 to step F112 and instructs the tray drive section 22 to eject the disk tray 22, thereby enabling the disk 90 to be returned to the user. In step F113, the computer 20 instructs the keyboard in/out drive section 26 to retract the keyboard 12, thereby finishing the process.

If the user wishes for user ID registration processing, he or she inputs a code as user ID. In this case, the computer 20 advances the process from step F109 to step F110 and writes the input user ID to the predetermined area of the disk 90.

In the case where the user uses the public downloading apparatus 1 only to perform user ID registration, the finishing operation is performed in step F111. In this case, the computer 20 advances the process from step Fill to step F112 and to step F113 to finish the process by ejecting the disk 90 and retracting the keyboard 12.

On the other hand, if the user performs an operation such as to continue using the public downloading apparatus 1, the computer 20 advances the process from step F111 to step F114.

In the case where the loaded disk 90 has the registered user ID (step S2 has been performed), the computer normally advances the process to step F114. From step F114 to step F119, processing for receiving payment of a fee is performed. This processing corresponds to steps S5 and S11 shown in FIG. 11.

First, in step F114, payment registration information on the disk 90 is checked. If the user has completed the procedure for credit card registration payment (payment registration in Step S3), information that registration payment is allowed with respect to the disk exists as payment registration information on the disk.

If such data has been recorded, the computer 20 advances the process from step F115 to step F116 to request the user to select a payment method, i.e., registration payment or deposition payment.

Figure 15:
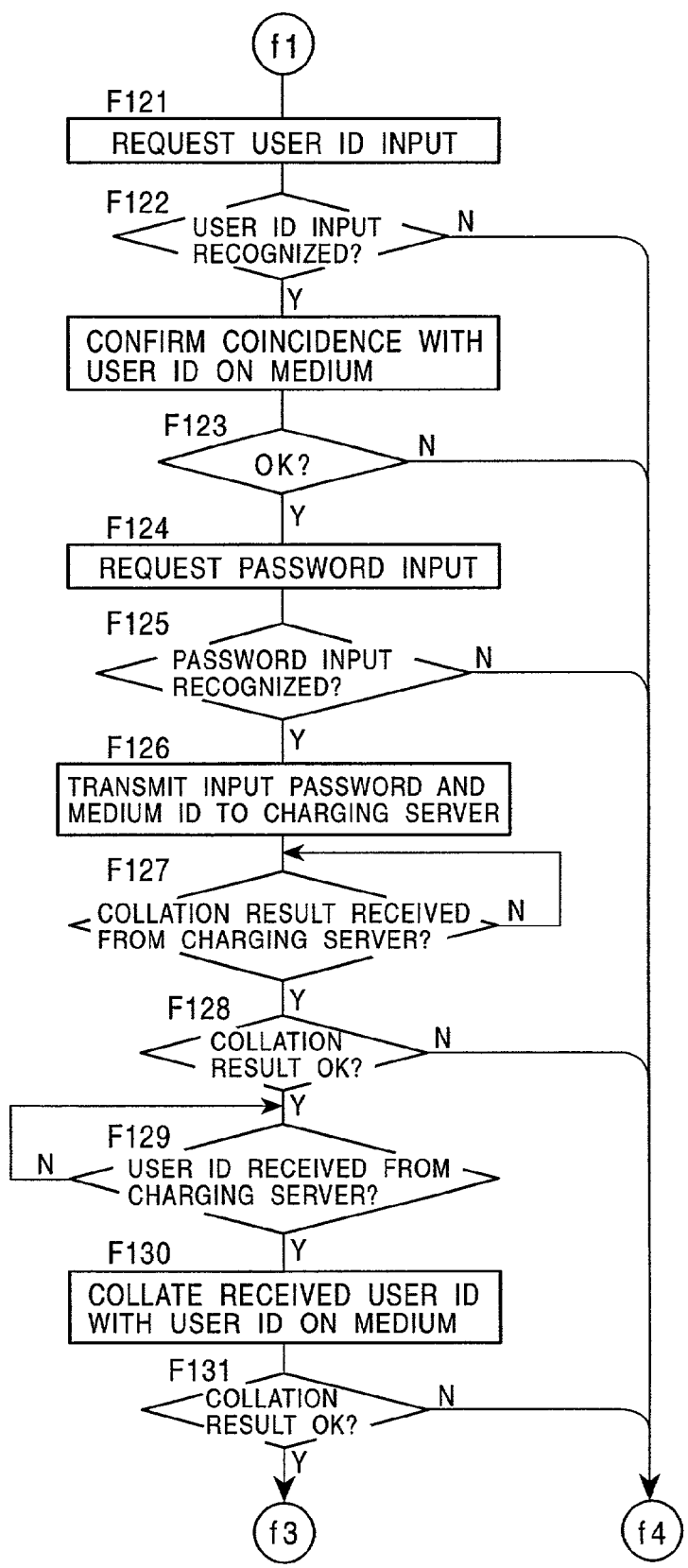
FIG. 15 is another flowchart of processing in the public downloading apparatus connected to the network in the embodiment of the invention.

If the use selects registration payment in step F117, the computer 20 advances the process from step F120 shown in FIG. 15 to perform one of various collation processings as use condition confirmation processing corresponding to registration payment.

On the other hand, if the user selects deposition payment in step F117, or it is determined in step F115 that no registration for registration payment has been completed with respect to the disk, the computer 20 advances the process to step F118 and requests the user to deposit or insert coins, a prepaid card or a credit card.

Figure 16:
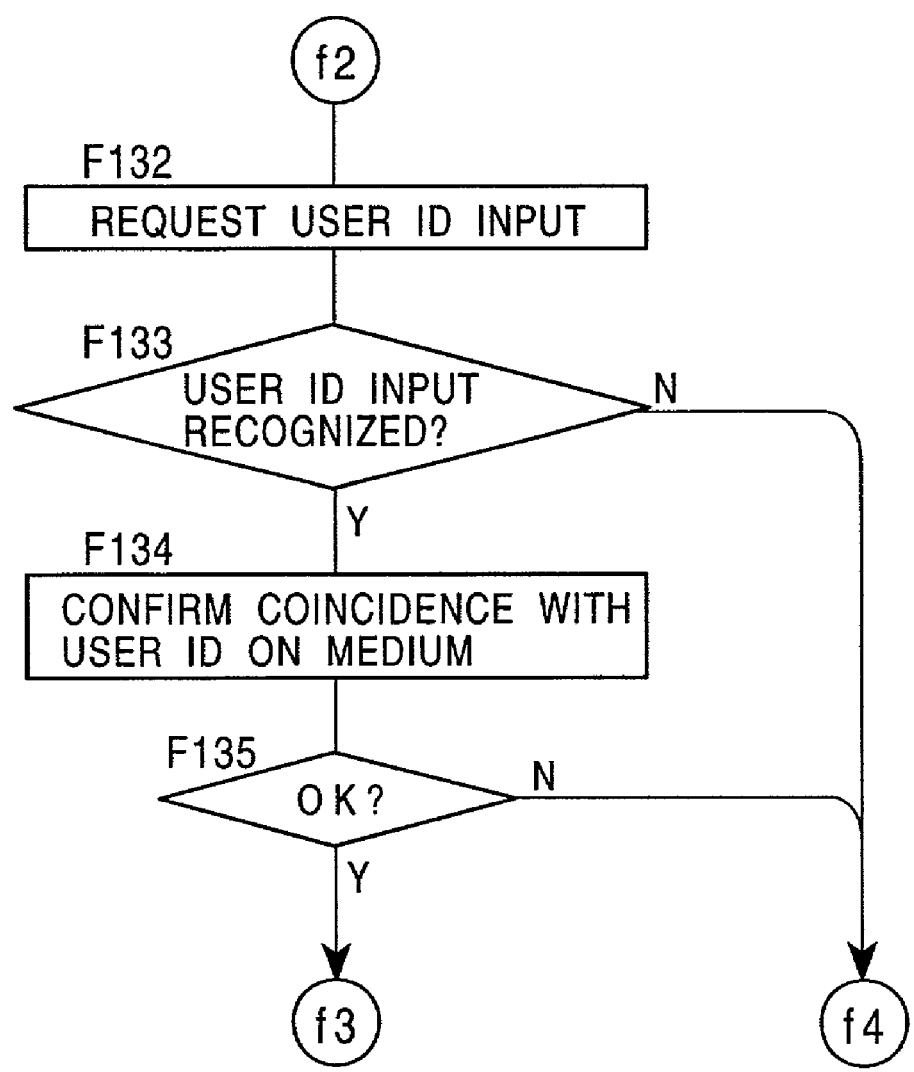
FIG. 16 is another flowchart of processing in the public downloading apparatus connected to the network in the embodiment of the invention.

When the user deposits or inserts coins, a prepaid card or a credit card at this request, the computer 20 advances the process to step F132 shown in FIG. 16 to perform collation processing as use condition confirmation processing corresponding to deposition payment.

If the user does not deposit or insert coins, a prepaid card or a credit card, that is, for example, if the user performs a finishing operation without deposition or insertion or if the user fails to perform deposition or insertion in a predetermined time period, the computer 20 advances the process from step F119 to step F112 and to step F113 to finish the process by ejecting the disk 90 and retracting the keyboard 12.

Processing from step F120 is performed as use condition confirmation processing in the case where registration payment is selected in step F117.

First, in step F120, the computer 20 requests the user to input the user ID recorded as a personal identification number on the disk 90.

When the user inputs the user ID, the computer 20 advances the process from step F121 to step F122 to perform checking as to whether the sequence of user ID characters recorded on the disk 90 and the sequence of user ID characters input coincide with each other.

If coincidence of the two sequences of user ID characters is recognized, the computer 20 advances the process from step F123 to step F124 to request the user to input the password, i.e., the personal identification number set by the user at the time of credit card payment registration.

When the password is input, the computer 20 advances the process from step F125 to step F126 to transmit the input password and the medium ID (serial number) recorded on the disk 90 to the charging server 2a via the network 7 after enciphering them.

Then, on the charging server 2a side, processing for collation between the received data and the registered data is performed and a result of this collation is transmitted to the public downloading apparatus 1. The public downloading apparatus 1 waits until receiving a collation result in step F127.

When a collation result is received from the charging server 2a, the computer 20 checks the content of the received collation result in step F128 and advances the process to step F129 if the collation result is OK.

At this time, the charging server 2a further enciphers and transmits the user ID from the registered data. In step F129, the public downloading apparatus 1 waits until receiving the transmitted user ID.

When the user ID from the charging server 2a is received, the computer 20 deciphers the received user ID and collate the received user ID with the user ID recorded on the disk 90. If the result of this collation is OK, the computer 20 advances the process from step F131 to step F136 shown in FIG. 17 to enable the user to actually use the public downloading apparatus 1 (to execute downloading).

That is, when the affirmative result is obtained in step F131, use condition confirmation processing is completed and it is determined that use of the public downloading apparatus 1 by credit card registration payment is allowed. That is, use of the public downloading apparatus 1 by the user is recognized as authorized.

If the result of one of steps F121, F123, F125, F128, and F131 in this use condition confirmation processing is NO, it is determined that the conditions for use are not satisfied and that the user is not allowed to use the public downloading apparatus 1. That is, such a determination is made in the case where no user ID is input (F121), the case where the input user ID is not correct (F123), the case where no password is input (F125), the case where the result of collation on the charging server 2a side is not OK (F128), or the case where the user ID registered with the charging server 2a and the user ID on the disk 90 do not coincide with each other (F131).

In an event corresponding to one of these cases, the computer 20 advances the process to step F112 and to step F113 shown in FIG. 14 to terminate the process by ejecting the disk 90 and retracting the keyboard 12.

FIG. 19 shows processing performed by means of communication as use condition confirmation processing shown in FIG. 15 with respect to registration payment.

Disk 90 loaded in public downloading apparatus 1 has a medium ID and a user ID recorded thereon, and the computer 20 of the public downloading apparatus 1 can read out them.

A user inputs the user ID by using the keyboard 12 at the above-mentioned input request in step F120. Then, processing P1 shown in FIG. 19 is first performed for collation between the user ID on the disk 90 and the input user ID. This processing corresponds to step F122.

The computer 20 then requests the user to input a password, and the user inputs the password by using the keyboard 12.

The computer 20 enciphers the medium ID and the input password by processing P2, and transmits the enciphered medium ID and password to the charging server 2a in communication CM1.

The charging server 2a deciphers the content of communication CM1 to obtain the medium ID and the password. Payment registration data is stored on the charging server side, as described above with reference to FIG. 13. Processing K1 is performed for checking as to whether registration data exists which corresponds to the combination of the medium ID and the password transmitted to the charging server 2a.

If the user has been properly registered and has input the correct password, the result of this collation is OK. If the user, not knowing the correct password, inputs a wrong password or if the user makes an error in inputting the password, the result of collation is not OK.

This collation result is transmitted from the charging server 2a to the public downloading apparatus 1 in communication CM2.

The computer 20 checks the content of communication CM2. This processing corresponds to the processing in steps F127 and F128.

The charging server 2a then enciphers the user ID in the corresponding registration data by processing K2 and transmits the enciphered user data to the public downloading apparatus 1 in communication CM3.

The computer 20 of the public downloading apparatus 1 deciphers the content of communication CM3 by processing P4 and performs; collation between the deciphered user ID and the user ID read from the disk 90. This processing corresponds to steps F129, F130, and F131.

If the result of each of processings P1, P3, and P4 on the public downloading apparatus 1 side is OK, the public downloading apparatus 1 can be used. This system has improved security for reasons described below.

Collation of the user ID by processing P1 is performed to make determination as to whether the checked person is the user authorized with respect to the disk 90.

Collation by processing K1 is performed to make determination as to whether the checked person is the authorized user who has completed credit card payment registration (who knows the password). The same checking is also performed by processing P4.

These three stages of checking prevent the credit card registration payment system from being used with the disk 90 by an unauthorized person, e.g., a person who has stolen the disk.

The security of the credit card number or the personal identification number is also improved for the following reason.

Since the credit card number and the password are not recorded on the disk 90, another person cannot know them even if the disk 90 is stolen. Also, the credit card number itself is not transmitted by network 7 communication. Therefore, security against communication interception is ensured.

The password and the medium ID are transmitted after being enciphered. The user ID is also transmitted after being enciphered. Therefore, even if the information transmitted in communication is intercepted, the password and so on cannot be deciphered.

Even if they are deciphered, there is substantially no possibility of the combination of the password, medium ID and user ID being stolen at a time by interception of one communication path because communication CM1 of the password and the medium ID and communication CM3 of the user ID are performed separately from each other. In particular, in communication on the network, a communication channel is set for each communication. Therefore, it is next to impossible to intercept, in communication at a certain time, communication CM3 relating to communication CM1 performed at a different time.

Therefore, there is substantially no possibility of the combination of the password, medium ID and user ID being stolen.

Consequently, public downloading apparatus 1 can be used by performing payment based on credit card registration while a high degree of security of the system is maintained.

In the case of use of public downloading apparatus 1 with deposition payment, such a high degree of security is not required.

Therefore, use condition confirmation processing performed in the case of execution of deposition payment from step F119 shown in FIG. 14 is as represented by step 132 and other subsequent steps shown in FIG. 16.

First, in step F132, the computer 20 requests the user to input the user ID recorded as a personal identification number on the disk 90.

After the user has input the user ID, the computer 20 advances the process from step F133 to step F134 to perform checking as to whether the sequence of user ID characters recorded on the disk 90 and the sequence of user ID characters input coincide with each other.

Figure 17:
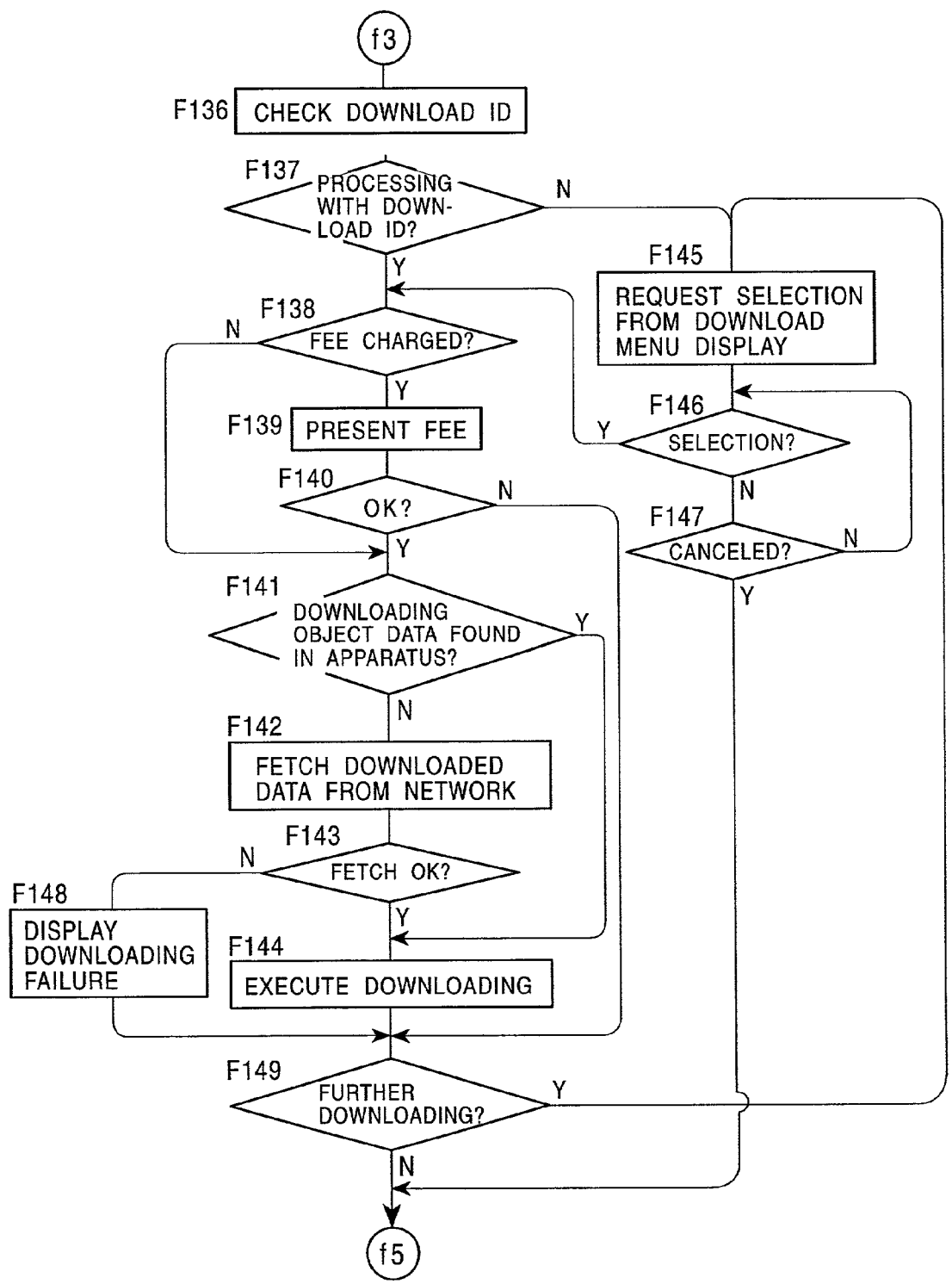
FIG. 17 is another flowchart of processing in the public downloading apparatus connected to the network in the embodiment of the invention.

If the two sequences of user ID characters coincide with each other, the computer 20 advances the process from step F135 to step F136 shown in FIG. 17 to enable the user to actually use of the public downloading apparatus 1.

When the checked person is identified as the authorized user according to the affirmative result obtained in step F135, use condition confirmation processing is completed to allow the user to use the public downloading apparatus 1 with deposition payment.

If the result of one of steps F133 and 135 in this use condition confirmation processing is NO, it is determined that the conditions for use are not satisfied and that the user is not allowed to use the public downloading apparatus 1.

That is, if no user ID is input (F133), or if the input user ID is not correct (F135), the computer 20 advances the process to step F112 and to step F113 to terminate the process by ejecting the disk 90 and the keyboard 12. That is, the computer 20 determines that the checked person is not the authorized user with respect to the disk 90, and terminates the process.

With the advancement of the process to step F136 shown in FIG. 17, the user is allowed to start downloading using the public downloading apparatus 1.

In step F136, the computer 20 first checks the download ID recorded on the disk 90.

Next, in step F137, the computer 20 makes a determination as to whether the apparatus is in a mode for performing downloading according to the download ID.

In this embodiment, the public downloading apparatus 1 is normally set in the mode (automatic mode) for performing downloading according to the download ID, and information designated by the download ID is automatically downloaded to the disk 90 without a user's operation for specially selecting information which the user wants to download. Under this condition, the result of step F137 is YES and the computer 20 advances the process to step F138. However, the-e user can select information which he or she wants to download. The arrangement may be such that one of an automatic mode and a selecting mode can be previously selected (by a user's operation or in system setting), which is not shown in the flowchart. If the apparatus is in the selecting mode, the computer 20 advances the process from step F137 to step F145.

The arrangement may alternatively be such that a disk with which processing in the automatic mode is always executed and another disk with which the mode can be selected (that is, information not designated by the download ID can also be downloaded) are prepared as disks 90, and information indicating one of these types is recorded on each disk 90. Also, the process may diverge at step F137 according to the type of the loaded disk.

When the computer 20 advances the process to step F138 to execute downloading of information designated by the download ID recorded on the disk 90, it makes a determination as to whether the information is provided for pay or free.

Sorts of information downloadable are, for example, an electronic mail sent to the user, an application program not possessed by the user, an electronic publication, and a content of a medium such as a piece of music.

If the information to be downloaded is information downloadable without charge, e.g., an electronic mail, the computer 20 advances the process directly to step F141.

The same transition in the process is made with respect to other downloading objects such as application programs and contents of media if they are provided without charge, On the other hand, if information such as an application program or a content of a medium provided for pay is designated as a downloading object, downloading of such an object corresponds to purchase of the object. Accordingly, the computer 20 presents in step F139 a fee charged for downloading and waits for a user's operation. The user confirms the amount charged and performs an OK operation. In response to this OK operation, the computer 20 advances the process from step F140 to step F141.

If the user does not perform OK operation after seeing the fee presentation, the computer 20 advances the process from step F140 to step F149 without executing downloading.

In step F141, the computer 20 ascertains whether the downloading object information exits in the public downloading apparatus 1, i.e., in the hard disk drive 21.

If the information exists, the computer advances the process to step F144 to execute downloading of the information to the disk 90.

If the downloading object information does not exit in the public downloading apparatus 1, the computer 20 makes a demand for loading of the necessary information on a network terminal (e.g., contents server 4a or application server 5a) in step F142.

When fetching of the necessary downloading object information from the network is completed, the computer 20 advances the process from step F143 to step F144 to execute downloading of the loaded information to the disk 90.

If fetching of the necessary downloading object information from the network results in failure for some reason, the computer 20 informs the user in step F148 of this non-downloadable condition by making a display of this information on the display 11, and advances the process to step F149 without executing downloading.

Preferably, ascertainment as to whether the necessary downloading object information exists in each of steps F141 and F143 includes, for example, ascertainment of the state of updating of the downloading object information as well as ascertainment of the existence of the downloading object information or the loading execution OK condition.

For example, with respect to downloading information such as an electronic newspaper or an electronic magazine updated irregularly or periodically, a case may be taken into consideration in which information downloaded to disk 90 a certain period before is still existing as the latest information. It is undesirable to again download the latest information while the user has the latest information on his or her disk 90.

For example, the user may use the public downloading apparatus 1 by wrongly believing that the information has recently been updated. In such a case, the same information not updated may be downloaded.

Therefore, it is desirable that, in the case where the same sort of information has been downloaded to the disk 90, the computer 20 checks the data of updating, the version number, etc. and executes downloading only if information having newer contents exists. If such ascertainment is also performed in steps F141 and F143, occurrence of downloading the same information to the same disk 90 two or more times can be avoided.

If downloading is not executed for such a reason, it is desirable to inform the user that downloading will not be performed because of the existence of the latest information recorded on the disk 90 in step F148.

After execution of downloading in step F144 (or if the necessary information does no exist, or downloading is not performed because the information has not been updated), the computer 20 advances the process to step F149 to make a determination as to whether downloading of further information will be performed.

In this step, if, for example, the same mode as that in step F137 is set, that is, the mode of downloading only the information designated by the download ID has been selected, it is determined that downloading of other information will not be executed. However, if a plurality of download IDs are recorded, the computer 20 starts downloading information designated by another downloading ID (returns to step F138 in this case, which is not indicated in flowchart).

Alternatively, in step F149, regardless of the selection of the above-mentioned automatic mode and selecting mode, the user may be asked whether to execute downloading of other information. In such a case, a user' operation is awaited and an affirmative or negative determination results according to the user's operation. If the user performs an operation for execution, the computer 20 advances the process to step F145. As mentioned above, a move from step F137 to step F145 is also possible.

Processing from step F145 to step F147 is performed to enable the user to select information which the user wants to download.

In step F145, the computer 20 makes a display such as shown in FIG. 20 on the display 11, for example, and asks the user for selection.

For example, in (a) of FIG. 20, a window through which the user can select and download a genre of information is illustrated. If the user selects "1: NEWSPAPER", names of certain newspapers are displayed as shown in (b) of FIG. 20, and the user is asked for selection from them. If the user wants to download an electronic newspaper published by DAILY THONAN, he or she selects "3: DAILY THONAN".

If such a selection is completed, the computer 20 advances the process from step F146 to step F138 and performs the above-described processing from step F138 to step F148, thereby executing downloading to the disk 90 (or advances the process to step F149 without executing downloading in some situation).

Figure 18:
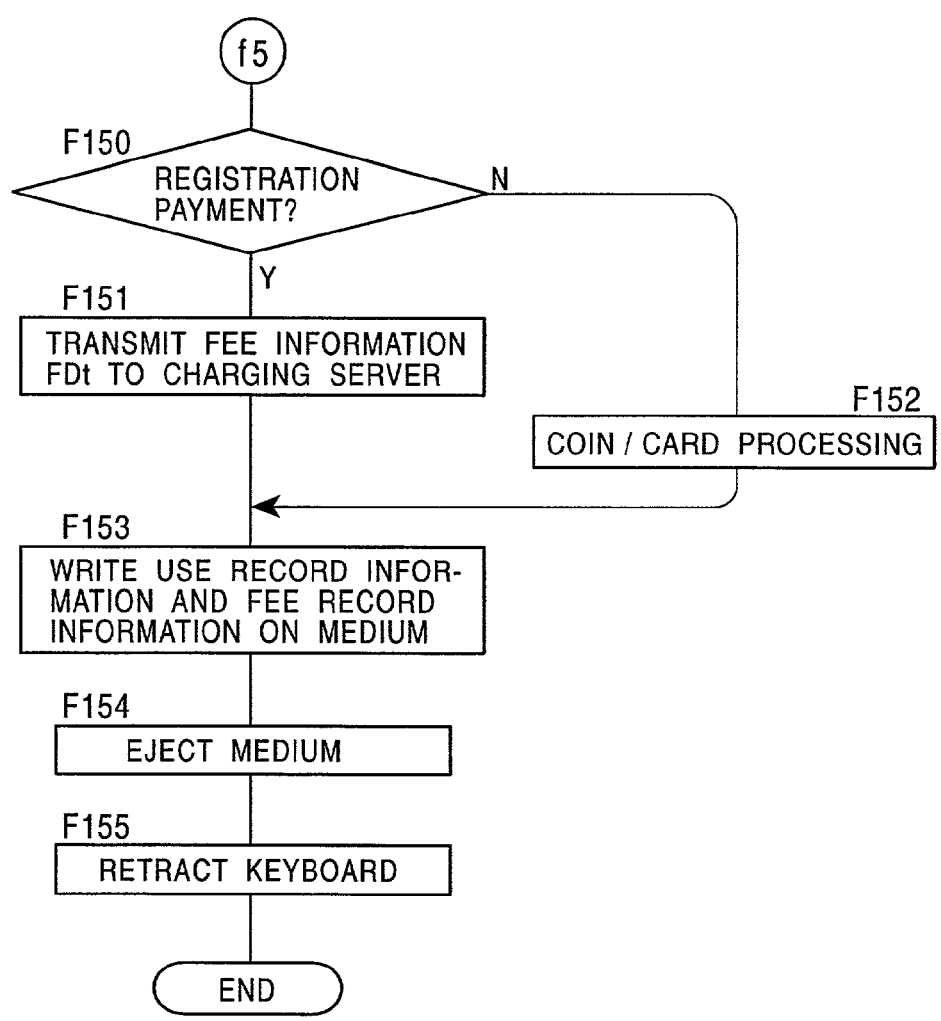
FIG. 18 is another flowchart of processing in the public downloading apparatus connected to the network in the embodiment of the invention.

If the user performs a canceling operation in the selecting window shown in FIG. 20, the computer 20 advances the process from step F147 to step F150 shown in FIG. 18.

As described above, download processing executed in the process shown in FIG. 17 enables the user to obtain particular information or freely selected information from the public downloading apparatus 1 by using the disk 90.

If it is determined in step F149 (by automatic decision with the computer 20 or by user's finishing operation) that downloading of other information will not be executed, the computer 20 advances the process to step F150 shown in FIG. 18.

In step F150, a determination is made as to whether the present use of the public downloading apparatus 1 is in combination with registration payment. If the case of registration payment, information of fees which the user is demanded to pay is transmitted to the charging server 2a in step F151. For example, information of a public downloading apparatus use time period and a public downloading apparatus use fee, information of an application purchase fee and an application name, and information of a content purchase fee and a content name, etc. are transmitted to the charging server 2a. Then, as described above with reference to FIG. 1, the charging server 2a makes a demand on the credit card company 3 based on the information, as described above with reference to FIG. 1. The credit card company 3 receives from a user's bank account the corresponding amount of money and pays the fees to the corresponding organizations in the public downloading apparatus management company 2, the contents company 4, the application company 5, etc.

If it is determined in step F150 that the present use of the public downloading apparatus 1 is in combination with deposition payment, charging processing is performed with respect to deposited coins or an inserted prepaid card or credit card. Information of this charging is set to, for example, the public telephone management company 6, and the public telephone management company 6 pays the necessary fees to the corresponding organizations.

In step F153, the computer 20 writes to the disk 90 use record information and fee record information having contents such as those shown in FIG. 9 and 10 according to details of the present use of the public downloading apparatus 1.

The disk 90 is ejected in step F154 and the keyboard 12 is retracted in step F155, thereby finishing the process.

Processing is performed in the public downloading apparatus 1 as described above. The above-described processing, however, is only an example of the overall processing in the system.

In the apparatus with which the payment method is limited to registration payment, no processing corresponding to deposition payment is performed regardless of whether the apparatus is of the type A or B. In the apparatus with which the payment method is limited to deposition a payment, no processing corresponding to registration payment is performed.

Needless to say, in a system in which public downloading apparatus 1 can be used without charge to processing corresponding to registration payment or deposition payment is performed.

[III] Non-network Downloading System

III-1. Construction of Public Downloading Apparatus.

A description will next be given of a downloading system using public downloading apparatuses corresponding to type-C public downloading apparatus 1 described above with reference to FIGS. 1 and 2, which are not connects to network 7, and which have no satellite communication function. In an example of the system described below, apparatuses are provided for free use by many and unspecified users.

Figure 21:
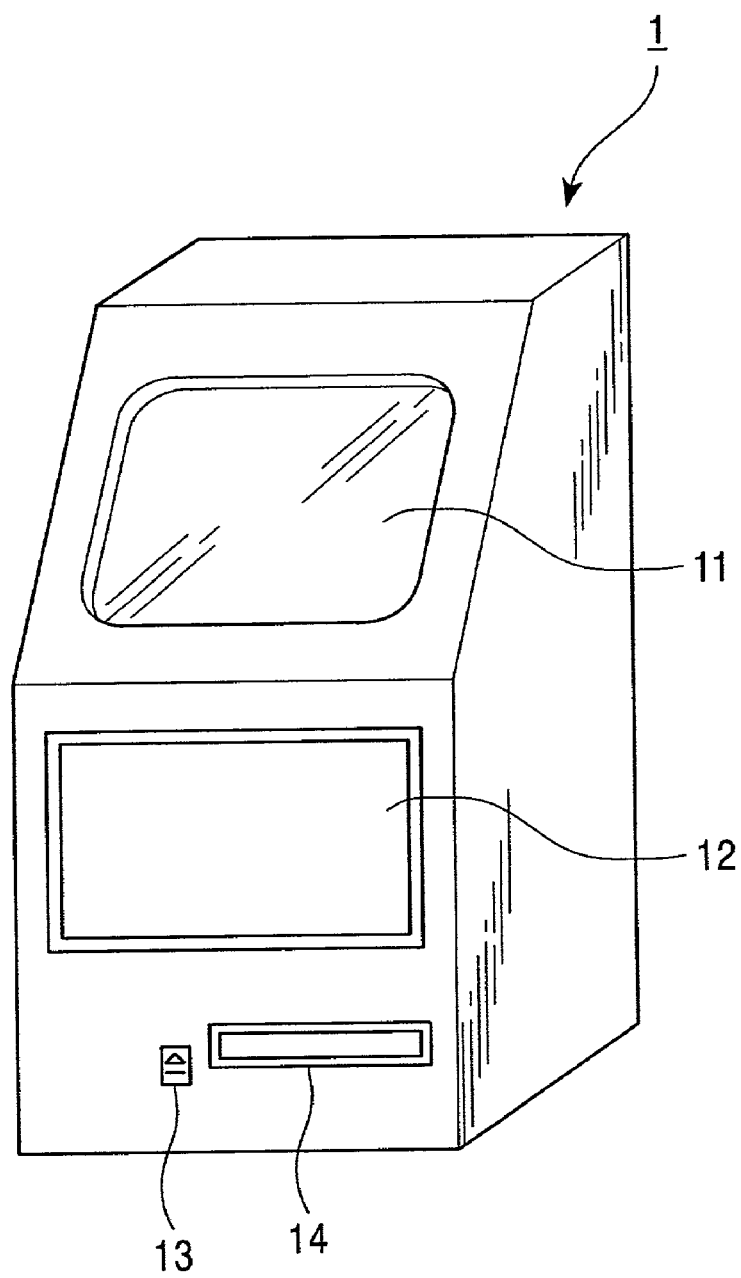
FIG. 21 is a diagram showing an external appearance of the public downloading apparatus not connected to the network in the embodiment of the invention.
Figure 22:
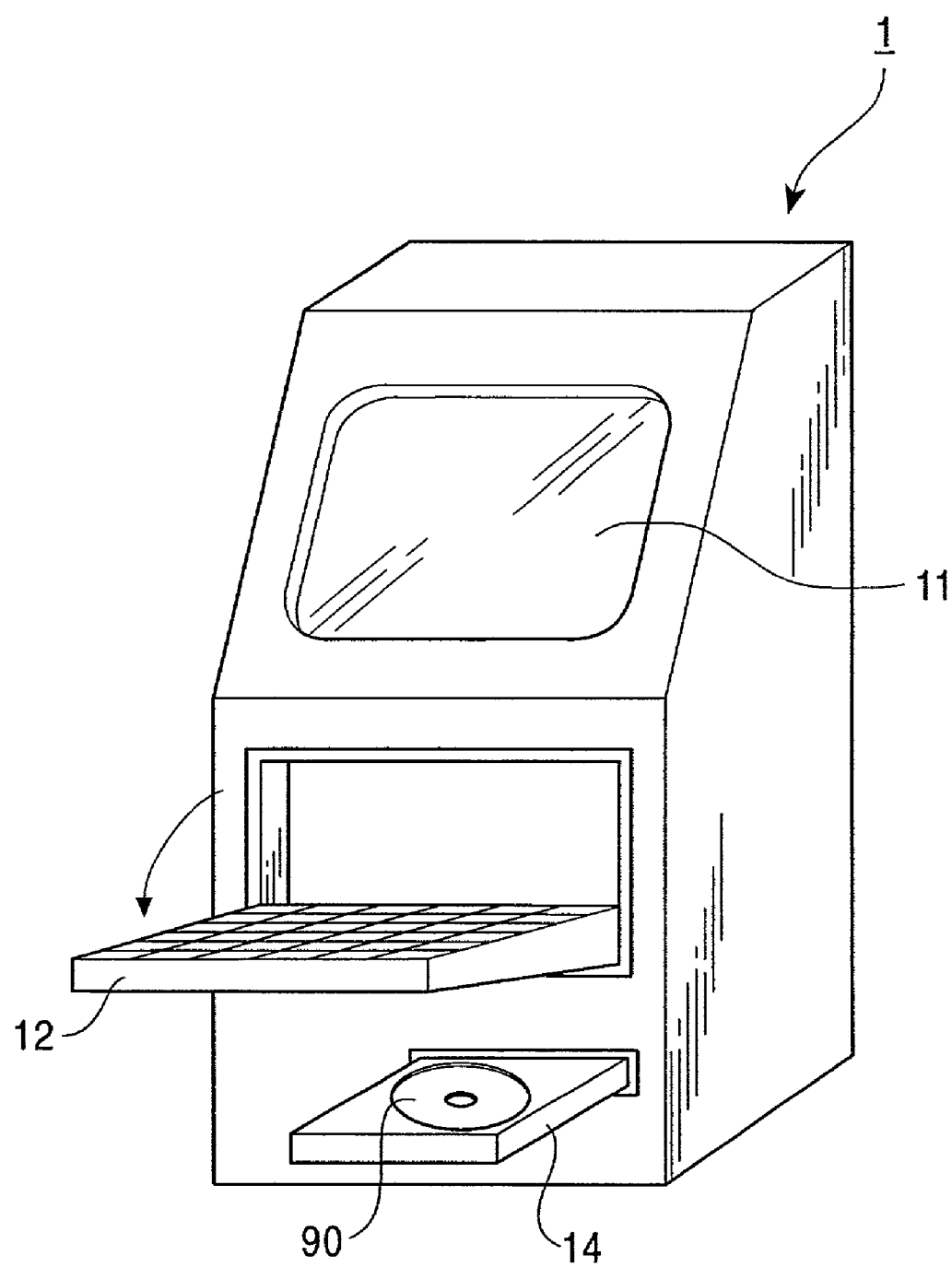
FIG. 22 is a diagram showing another external appearance of the public downloading apparatus not connected to the network in the embodiment of the invention.

FIGS. 21 and 22 show an external appearance of type-C public downloading apparatus 1 in this example. This public downloading apparatus 1 is connected to no network and to no telephone line and has no public telephone function. If they are used free of charge, no section for charging is required. Therefore, the apparatus may have only a display 11, a keyboard 12, an eject key 13 and a disk tray 14 as components seen in an external appearance, as illustrated.

The keyboard 14 may be of a drawn-out type such as that illustrated in FIGS. 3 and 4. In this example, however, it is of a lid type movable from a retracted state shown in FIG. 21 to a usable state shown in FIG. 22. That is, the keyboard 12 is in a closed position in a front portion of the public downloading apparatus 1 as shown in FIG. 21 when it is not used. When it is used, it is swung to a usable position as shown in FIG. 22. This apparatus is also arranged so that the operation of swingingly moving the keyboard 21 is automatically performed at the time of a start or finish of use of the public downloading apparatus 1. However, the arrangement may alternatively be such that the keyboard 12 is manually moved swingingly by a user when use of the apparatus is started or finished.

The display 11, the eject key 13 and the display 14 are the same as those described above and the description for them will not be repeated.

Figure 23:
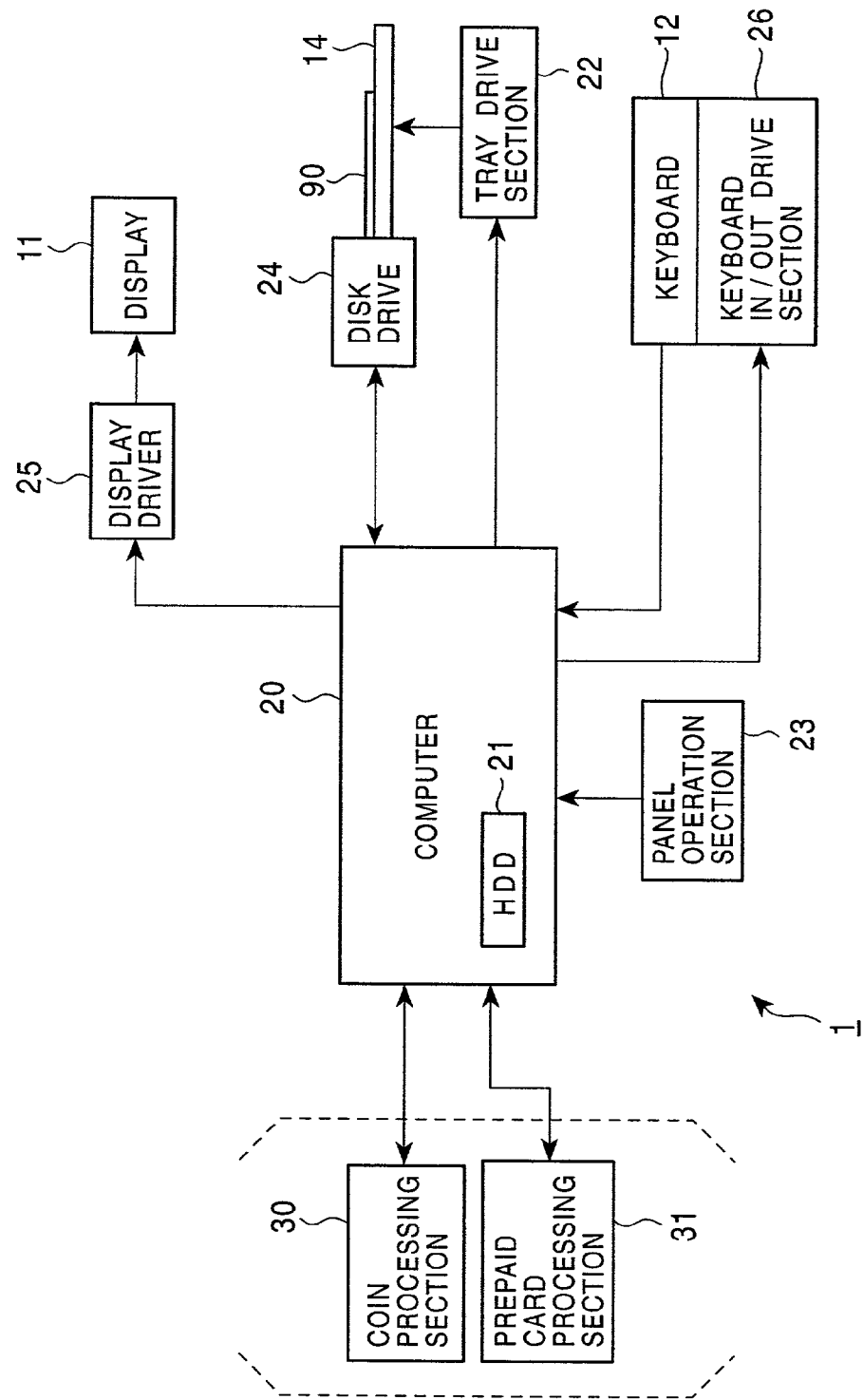
FIG. 23 is a block diagram of the public downloading apparatus not connected to the network in the embodiment of the invention.

FIG. 23 shows the internal configuration of the public downloading apparatus 1.

The computer 20 does not need to have network computer functions such as those described above by way of example.

Since the apparatus is not connected to a network and capable of functioning singly, the apparatus is constructed in such a manner that the functional sections relating to the network are removed from the arrangement shown in FIG. 5.

The computer 20 has an internal recording medium, e.g., a hard disk drive 21.

As input devices for the computer 20, a panel operation section 23 (eject key 13) and the keyboard 12 are provided. The keyboard 12 is swingingly driven by a keyboard in/out section 26.

In a disk drive 24, data is recorded on a disk 90 loaded on a disk dray 14 or data is reproduced from the disk 90.

A disk tray drive section 22 ejects or retracts the disk tray according to an instruction from the computer 20.

The disk drive 24 performs recording or reproducing operation when required by the computer 20 to record data on disk 90 loaded in the disk drive 24 or reproduce data from the disk 90.

Since no network communication and no satellite communication are performed with respect to this apparatus, installment of downloadable information to the hard disk drive 21 or updating of information in the hard disk drive 21 is performed by using a disk.

That is, a disk 90 for a different use, e.g., for updating downloadable data may be prepared not in the possession of a user but in the possession of a provider. For example, if a need has arisen to install downloadable data or to update certain information stored as downloadable data in the hard disk drive 21, the provider of the information (e.g., contents company 4 or the like) loads a disk prepared for such a purpose, and new information or updating information is read from this disk to the computer 21. In this manner, a file of downloadable information is registered or updated.

Needless to say, a CD-ROM drive or the like may be provided to enable downloadable information to be installed from a CD-ROM to the hard disk drive 21.

The display 11 displays a GUT image or the like, as does a display of an ordinary personal computer. The computer 20 supplies a display driver 25 with information which is to be displayed, and the display driver 35 makes a display of the information on the display 11.

These sections operate in the same manner as those described above with reference to FIG. 5 and a further detailed description will not be made for them.

The public downloading apparatus 1 may be adapted to pay use. However, since the apparatus has no communication function, only a charging system using coin or prepaid card deposition payment can be used. If such a fee-charging system is used, a coin processing section 30 and a prepaid card processing section 31 are provided as shown in parentheses in FIG. 23. In such a case, a coin slot and a prepaid card slot, not shown in FIGS. 21 and 22, are formed in the body of the apparatus.

Type-C public downloading apparatus 1 is thus constructed. However, it is not always necessary to provide all the above-described components, and other components not illustrated may be provided. For example, modifications, such as those described with respect to the arrangement shown in FIG. 5, characterized by provision of a printer or use of a mouse, are also conceivable.

III-2 Processing in Public Downloading Apparatus

Figure 24:
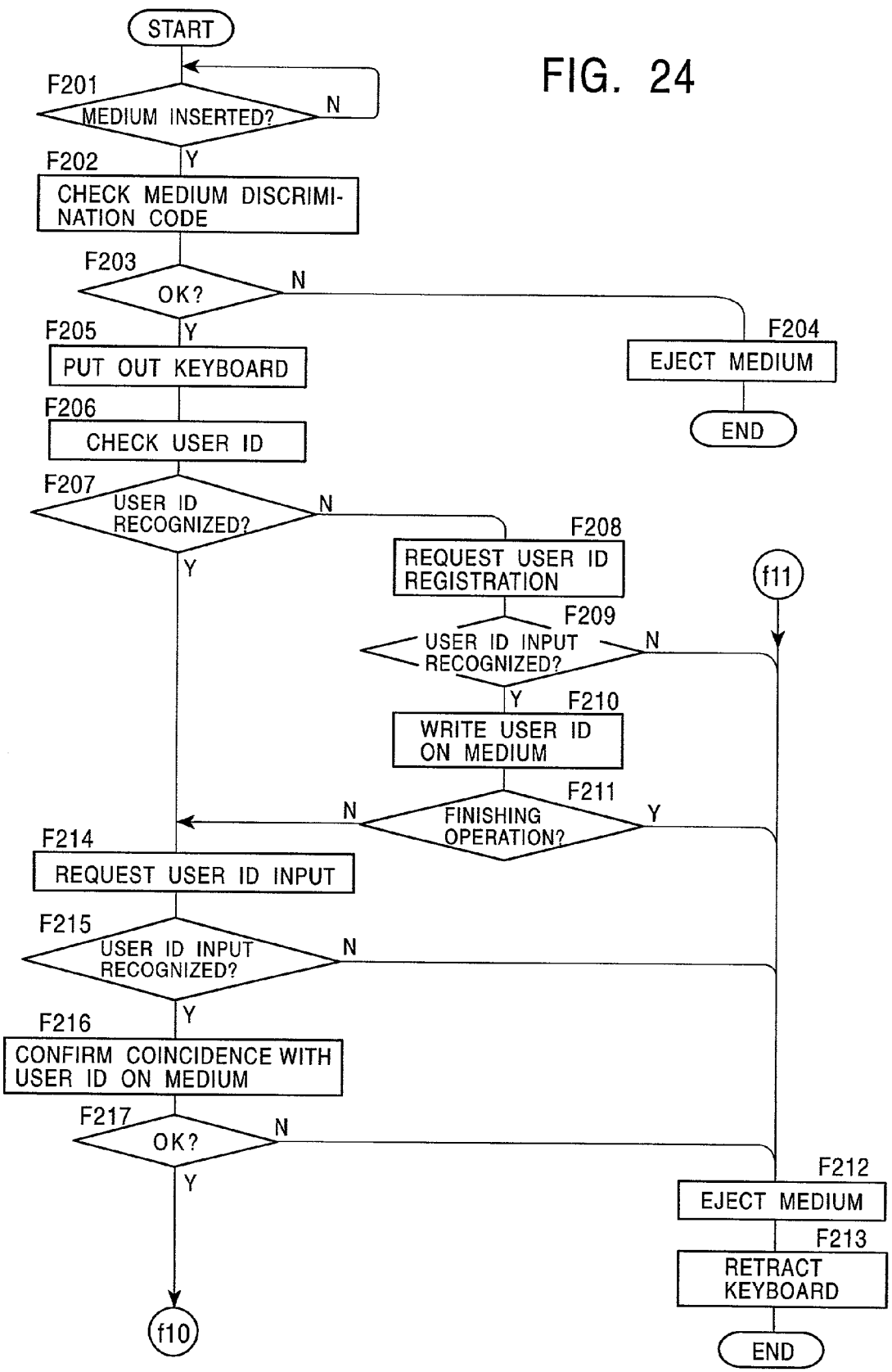
FIG. 24 is a flowchart of processing in the public downloading apparatus not connected to the network in the embodiment of the invention.

Processing performed by the computer 20 of the thus-constructed type-C public downloading apparatus 1 will be described with reference to FIGS. 24 and 25. Disk 90 used in this public downloading apparatus is the same as that used in the above-described type-A and type-B public downloading apparatuses 1. Since the downloading system is used free of charge, the procedure for use by a user is as represented only by steps S1→S2→S10→S12→S13→S15→S16 shown in FIG. 11.

This public downloading apparatus 1 is maintained in a standby state, such as shown in FIG. 21, in an installation place. When a user loads disk 90 in the apparatus, the process shown in FIGS. 24 and 25 is started. A disk inserting operation is performed, which corresponds to the procedure consisting of the operation of the eject key 13, the placement of the disk on the disk tray 14 and the operation of the eject key 13 performed by the user. Then, the computer 20 advances the process from step F201 to step F202 shown in FIG. 24.

Processing from step F201 to step F211 is the same as that from step F101 to step F111 shown in FIG. 14 and detailed description for it will not be repeated. That is, by this processing, checking of a discrimination code of the loaded disk 90 and ejection of the keyboard 12 are performed and a user ID is checked for determination as to whether it has been registered. If no user ID has been registered with respect to the disk and if the user wishes to have a user ID registered by ID registration processing, processing for writing a user ID input by the user to a predetermined area of the disk 90 is performed.

In a situation where the user loads a disk 90 with a registered user ID (already processed by step S2 shown in FIG. 11), the computer 20 normally advances the process to step F214 to start use condition confirmation processing. In this processing, the computer 20 requests the user to input the user ID recorded as a personal identification number on the disk 90.

After the user has input the user ID, the computer 20 advances the process from step F125 to step F216 to perform checking as to whether the sequence of user ID characters recorded on the disk 90 and the sequence of user ID characters input by the user coincide with each other.

Figure 25:
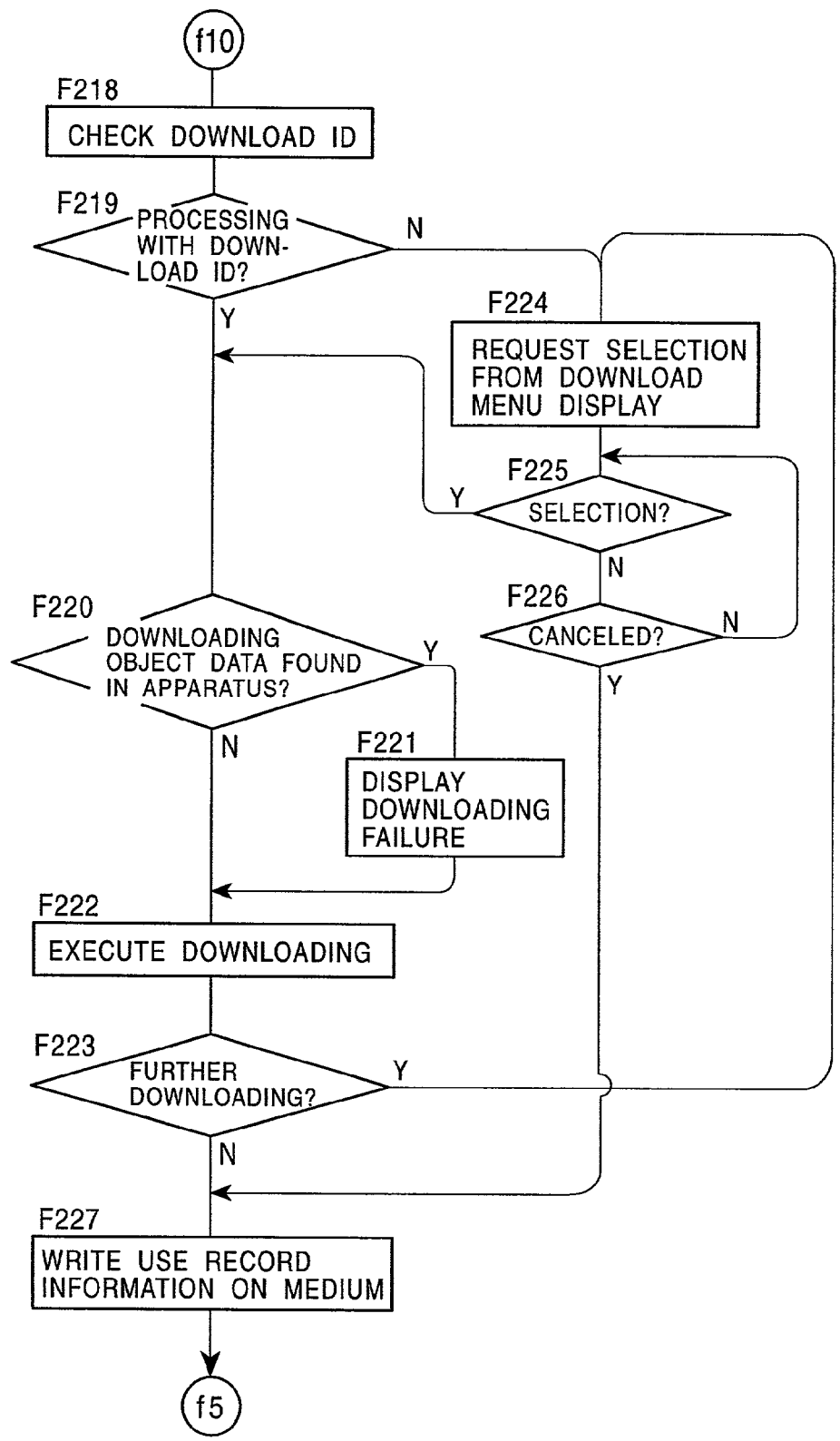
FIG. 25 is another flowchart of processing in the public downloading apparatus not connected to the network in the embodiment of the invention.

If the two sequences of user ID characters coincide with each other, the computer 20 advances the process from step F217 to step F218 shown in FIG. 25 to enable the user to actually use the public downloading apparatus 1.

If the result of one of steps F215 and 217 is NO, that is, if no user ID is input, or if the input user ID is not correct, the computer 20 determines that the checked person is not the authorized user with respect to the disk 90, and advances the process to step F212 and to step F213 to terminate the process by ejecting the disk 90 and by retracting the keyboard 12.

With the advancement of the process to step F218, the user is allowed to start downloading using the public downloading apparatus 1.

In step F218, the computer 20 first checks the download ID recorded on the disk 90.

Next, in step F219, the computer 20 makes a determination as to whether the apparatus is in a mode for performing downloading according to the download ID. The process diverges at step F219 depending upon mode setting, an operating procedure introduced into the system, a user' operation, or the like, as does the process at step F137 shown in FIG. 17.

If the computer 20 advances the process to step F220 to execute downloading of information designated by the download ID recorded on the disk 90, it ascertains whether the downloading object information designated exits in the public downloading apparatus 1, i.e., in the hard disk drive 21.

If the information exists, the computer advances the process to step F222 to execute downloading of the information to the disk 90.

If the downloading object information does not exit in the public downloading apparatus 1, the computer 20 informs the user in step F221 of this non-downloadable condition by making a display of this information on the display 11, and advances the process to step F149 without executing downloading.

Preferably, ascertainment as to whether the necessary downloading object information exists in step F220 includes, for example, ascertainment of the state of updating of the downloading object information as well as ascertainment of the existence of the downloading object information or the loading execution OK condition, as described above with respect to step F141 shown in FIG. 17. For the above-described reason, it is preferable to perform this ascertainment processing to avoid downloading the same information to the same disk 90 two or more times.

After execution of downloading in step F222 (or if the necessary information does no exist, or downloading is not performed because the information has not been updated), the computer 20 advances the process to step F223 to make a determination as to whether downloading of further information will be performed.

The process diverges at step F223 depending upon mode setting, an operating procedure introduced into the system, a user' operation, or the like, as does the process at step F149 shown in FIG. 17.

If information selected by the user is downloaded, the computer 20 advances the process from step F223 or 219 to step F224.

Processing from step F224 to step F226 is performed to enable the user to select information which the user wants to download.

That is, in step F224, the computer 20 makes a display such as shown in FIG. 20 on the display 11, for example, and asks the user for selection. When certain information is selected by a user's operation, the computer 20 advances the process from step F225 to step F220 and performs the above-described processing from step F220 to step F222, thereby executing downloading to the disk 90 (or advances the process to step F223 without executing downloading in some situation).

If the user performs a canceling operation in the selecting window, the computer 20 advances the process from step F226 to step F227.

As described above, download profe'ssing executed in the process shown in FIG. 25 enables the user to obtain particular information or freely selected information from the public downloading apparatus 1 by using the disk 90.

If it is determined in step F223 (by automatic decision with the computer 20 or by user's finishing operation) that downloading of other information will not be executed, the computer 20 advances the process to step F227 and writes on the disk 90 use record information having contents such as shown in FIG. 9 according to details of the use of the public terminal 1 just finished.

The computer 20 finishes the process by ejecting the disk 90 in step F212 and retracting the keyboard 12 in step F213.

Processing is performed in the public downloading apparatus 1 as described above. The above-described processing, however, is only an example of the overall processing in the system.

If the downloading system is formed as a fee-charging system requiring deposition payment in coin or the like, it includes additional processings, e.g., processing for requesting deposition of coins or the like at the time of starting use, processing for presenting a fee at the time of executing downloading, processing for presenting a fee at the time of finishing use, and processing for writing fee record information such as shown in FIG. 10.

With a system formed of public downloading apparatuses 1 constructed as described above without a network, information cannot be distributed through an area as wide as a networked area. However, such a system is useful in terms of installation facility. The public downloading apparatus 1 without network connection can also used suitably as a public downloading apparatus usable only by persons in a particular region, e.g., those in a particular organization such as a school or an enterprise.

As can be understood from the foregoing, the present invention can be realized as a downloading system which is useful, safe and convenient, and which can readily be used by many and unspecified users.

According to the present invention, if many and unspecified users possess a recording medium, e.g., a disk-like medium, they can obtain various sorts of information (electronic books, electronic newspapers, music software, video software, application software, game software, etc.) according to their needs by downloading them via a network with downloading terminals provided as a public downloading apparatus. If users have a recording medium for such a purpose, they can use downloading terminals installed in various places. Thus, the downloading system of the present invention can be used very conveniently.

Specifically, a server system connected to the network is included to download various sorts of information through a wide area.

The downloading system can be used according to results of use condition confirmation processing. Therefore, unauthorized use, e.g., use of a recording medium by a person different from the possessor of the recording medium can be prevented.

The downloading operation is performed based on download ID information recorded on a recording medium. Therefore, downloading processing can be efficiently performed.

According to the present invention, a discrimination code information for discriminating a recording medium adapted to the downloading system from others is recorded on the recording medium. This discrimination code is used for use condition confirmation processing to enable only the recording medium suitable for use in the system to be used, thereby preventing erroneous use of the medium and a file damaging accident or the like caused by erroneous use.

According to the present invention, a user records, on his or her recording medium, user ID information for the same function as a personal identification number to improve security against unauthorized use.

According to the present invention, a user can write user ID information on his or her recording medium by using one downloading terminal. Therefore, a user who wants to use the downloading system is not required to possess a special ID writing device or personal computer, so that use by a greater number of persons can be promoted.

According to the present invention, serial number information provided on each of pieces of a recording medium is used for use condition confirmation processing. This is also effective in improving security for preventing unauthorized use.

According to the present invention, use condition confirmation processing is performed by using serial number information provided on each of pieces of a recording medium, user ID information, a password input by a user and a user collation information held in a server system, thereby ensuring security with respect to processing on the network.

According to the present invention, processing using user collation information in use condition confirmation processing is performed between each downloading terminal and the server system by communicating serial number information, user ID information and password information. Also, this communication of serial number information, user ID information and password information is executed by being separated into at least two communications. Therefore, there is substantially no possibility of all the serial number information, user ID information and password information being stolen on the network, thus realizing a high degree of security.

According to the present invention, information about a fee for use of each public downloading terminal can be held and checked by the server system, thereby enabling formation of a fee payment system using a credit card, for example.

According to the present invention, each downloading terminal itself can perform fee collection corresponding to payment in coin or use of a currency substitute card. For example, a user can use each downloading terminal by using a simpler fee payment method without credit card registration or the like.

According to the present invention, each downloading terminal automatically executes downloading of predetermined information based on download ID information recorded on a recording medium in the possession of a user, thereby reducing troublesome operations on the user side. It is also possible to prevent the user from downloading wrong information which the user does not wish to download.

According to the present invention, a selecting operation section provided in each downloading terminal enables a user to select information not designated by download ID information and to download the selected information to his or her recording medium, thus increasing varieties of information obtainable by users.

According to the present invention, use record information about use of some downloading terminals is recorded on a recording medium in the possession of a user, thereby enabling the user to confirm the contents of past downloading.

According to the present invention, fee record information in which amounts charged according use of some downloading terminals is written is recorded on a recording medium in the possession of a user, thereby enabling the user to confirm fees according to the states of execution of past downloading. This information may have an effect similar to that of a receipt.

According to the present invention, each downloading terminal may be constructed so that input section can be handled at the time of use only and is retracted to an unusable position when not used, thereby preventing a key on the keyboard from being inadvertently pressed or from being damaged or contaminated. This construction is suitable for installation at a store front, for example.

According to the present invention, each downloading terminal may be loaded with downloadable information from the server system by using a wireless communication section. Therefore, data in downloading terminals installed in a number of places can be updated promptly and easily, and information to be downloaded to a recording medium by being distributed through a wide area can be promptly prepared. For example, the downloading terminal with a wireless communication section is particularly suitable for downloading of electronic news papers or the like having information frequently updated.

According to the present invention, a recording medium adaptable to a downloading terminal provided as a public downloading apparatus can be realized and can be suitably used as a recording medium possessed by users.

In particular, a download ID is recorded on each of pieces of the recording medium, so that the recording medium can be used to download a particular sort of information only.

Recording serial number information, medium IDs and user IDs contributes to security of the downloading system in use.

Use record information and fee record information are also recorded to be conveniently used for confirmation of the state of use by the user or for detection of unauthorized use. Further, such records can also have the same role as a receipt.

What is claimed is:

1. A portable storage device used with a downloading apparatus for recording and physically transporting digital data, comprising:
    a storage assembly having a predetermined shape and being adapted to be received by or loaded into the data downloading apparatus of a data downloading system; and
    a main recording surface having at least four different recording areas including:
    a first non-rewritable recording area in which is recorded download identification information for designating information to be downloaded to the portable storage device when the portable storage device is loaded in the data downloading system, and medium identification information for identifying the portable storage device as permitted in the downloading system;
    a second rewritable recording area for recording digital data identified by the download information;
    a third area of the main recording surface in which information can be recorded as use record information regarding various processing executed by the downloading system when the portable storage device is loaded in the downloading system to which the portable storage device is adapted;
    a fourth area of the main recording surface in which information can be recorded as fee record information of fees charged with respect to various processing executed by the downloading system when the portable storage device is loaded in the downloading system to which the portable storage device is adapted;
    wherein the digital data is automatically recorded on the portable storage device by the data downloading system when the portable storage device is loaded into the data downloading apparatus and the medium identification information is recognized as being authorized for recording the digital data.

2. A method of using a portable storage device in a data downloading system for recording and physically transporting digital data, the method comprising:
    recording in a first non-rewritable recording area of the portable storage device download identification information for designating information to be downloaded to the storage device and medium identification information identifying the storage device as permitted in a data downloading apparatus of the data downloading system;
    loading in the data downloading apparatus the portable storage device, the portable storage device having a predetermined shape adapted to be received by or loaded into the data downloading apparatus; and
    automatically downloading or recording in a second rewritable recording area digital data identified by the download information;
    recording in a third area of the portable storage device use record information regarding various processing executed by the data downloading system when the portable storage device is loaded in the data downloading system;
    recording in a fourth area fee record information of fees charged with respect to various processing executed by the data downloading system when the portable storage device is loaded in the data downloading system;
    wherein the digital data is recorded on the storage device by the data downloading system when the medium identification information is authorized by the data downloading apparatus for recording the digital data.

* * * * *

UNITED STATES PATENT AND TRADEMARK OFFICE
CERTIFICATE OF CORRECTION

PATENT NO. : 7,237,001 B2  Page 1 of 1
APPLICATION NO. : 10/016242
DATED : June 26, 2007
INVENTOR(S) : Yokono et al.

It is certified that error appears in the above-identified patent and that said Letters Patent is hereby corrected as shown below:

Title Page, item 63, please add Related U.S. Application Data and Foreign Application Priority Data information:

--Related U.S. Application Data--

--Divisional of Application No. 09/174,769 filed on October 19, 1998--

--Foreign Application Priority Data--

--Nov. 7, 1997    (JP)    ..........................P09-305612--

Signed and Sealed this

Thirtieth Day of October, 2007

JON W. DUDAS
*Director of the United States Patent and Trademark Office*